United States Patent
Shelton

(10) Patent No.: US 9,516,015 B1
(45) Date of Patent: Dec. 6, 2016

(54) APPARATUS AND METHOD FOR CRYPTOGRAPHIC OPERATIONS USING ENHANCED KNOWLEDGE FACTOR CREDENTIALS

(71) Applicant: UNIVAULTAGE LLC, Austin, TX (US)

(72) Inventor: Barry K. Shelton, Austin, TX (US)

(73) Assignee: UniVaultage LLC, Austin, TX (US)

( * ) Notice: Subject to any disclaimer, the term of this patent is extended or adjusted under 35 U.S.C. 154(b) by 0 days.

(21) Appl. No.: 15/006,517

(22) Filed: Jan. 26, 2016

Related U.S. Application Data

(63) Continuation of application No. 14/838,770, filed on Aug. 28, 2015, now Pat. No. 9,288,204.

(51) Int. Cl.
*H04L 29/06* (2006.01)
*H03M 7/30* (2006.01)

(52) U.S. Cl.
CPC ......... *H04L 63/083* (2013.01); *H04L 63/0807* (2013.01); *H04L 63/0823* (2013.01); *H03M 7/705* (2013.01)

(58) Field of Classification Search
CPC .............................. H04L 63/083; H03M 7/705
See application file for complete search history.

(56) References Cited

U.S. PATENT DOCUMENTS

| | | | |
|---|---|---|---|
| 4,670,841 A | 6/1987 | Kostopoulos | |
| 7,444,368 B1* | 10/2008 | Wong | G06F 21/31 709/200 |
| 2005/0049997 A1* | 3/2005 | Shipp | G06Q 10/107 |
| 2007/0283154 A1* | 12/2007 | Zhang | H04L 63/0428 713/169 |
| 2008/0040612 A1* | 2/2008 | Dayan | G06F 21/36 713/183 |
| 2008/0092216 A1 | 4/2008 | Kawano et al. | |
| 2012/0011564 A1 | 1/2012 | Osborn et al. | |
| 2014/0040627 A1 | 2/2014 | Logan et al. | |
| 2014/0092097 A1* | 4/2014 | Naveh | G06F 17/214 345/467 |
| 2014/0189885 A1* | 7/2014 | Golan | G06F 21/32 726/28 |
| 2014/0223354 A1* | 8/2014 | Kandur Raja | H04M 1/72519 715/773 |

(Continued)

OTHER PUBLICATIONS

"BabelMap Online (Unicode 7.0)", available Jul. 16, 2014, accessed on May 20, 2016 @ [http://web.archive.org/web/20140716212637/http://www.babelstone.co.uk/Unicode/babelmap.html].*

(Continued)

*Primary Examiner* — Robert Leung
(74) *Attorney, Agent, or Firm* — Pillsbury Winthrop Shaw Pittman LLP

(57) ABSTRACT

Provided is a process that includes: obtaining a multi-byte character set specifying a plurality of characters; receiving a knowledge factor credential encoded with a plurality of characters of the multi-byte character set, wherein the knowledge factor credential has a longer effective length than an apparent length, and wherein the knowledge factor credential has at least one character outside of a block of characters designated for a locale of the computing device; and providing the knowledge factor credential to authenticate a user.

24 Claims, 18 Drawing Sheets

(56) References Cited

U.S. PATENT DOCUMENTS

2014/0373115 A1* 12/2014 Hartman ................ G06F 21/31
726/6

OTHER PUBLICATIONS

"BabelMap (Unicode Character Map for Windows)", published Jul. 1, 2014, accessed on Nov. 9, 2015 @ [https://web.archive.org/web/20140701081312/http://www.babelstone.co.uk/Software/BabelMap.html].*
Unicode Normalization Forms, Unicode Standard Annex #15, Jun. 1, 2015, 35 pages.*
UTF-32, Unicode Standard Annex #19, Mar. 27, 2002, 6 pages.*
International Search Report and Written Opinion for Related PCT Application PCT/US2016/044738, issued on Oct. 25, 2016, pp. 1 to 12.

* cited by examiner

| Code | | Character | Code | | Character | Code | | Character |
| --- | --- | --- | --- | --- | --- | --- | --- | --- |
| Dec | Hex | | Dec | Hex | | Dec | Hex | |
| 0 | 0x00 | NUL | 43 | 0x2B | + | 86 | 0x56 | V |
| 1 | 0x01 | SOH | 44 | 0x2C | , | 87 | 0x57 | W |
| 2 | 0x02 | STX | 45 | 0x2D | - | 88 | 0x58 | X |
| 3 | 0x03 | ETX | 46 | 0x2E | . | 89 | 0x59 | Y |
| 4 | 0x04 | EOT | 47 | 0x2F | / | 90 | 0x5A | Z |
| 5 | 0x05 | ENQ | 48 | 0x30 | 0 | 91 | 0x5B | [ |
| 6 | 0x06 | ACK | 49 | 0x31 | 1 | 92 | 0x5C | \ |
| 7 | 0x07 | BEL | 50 | 0x32 | 2 | 93 | 0x5D | ] |
| 8 | 0x08 | BS | 51 | 0x33 | 3 | 94 | 0x5E | ^ |
| 9 | 0x09 | TAB | 52 | 0x34 | 4 | 95 | 0x5F | _ |
| 10 | 0x0A | LF | 53 | 0x35 | 5 | 96 | 0x60 | ` |
| 11 | 0x0B | VT | 54 | 0x36 | 6 | 97 | 0x61 | a |
| 12 | 0x0C | FF | 55 | 0x37 | 7 | 98 | 0x62 | b |
| 13 | 0x0D | CR | 56 | 0x38 | 8 | 99 | 0x63 | c |
| 14 | 0x0E | SO | 57 | 0x39 | 9 | 100 | 0x64 | d |
| 15 | 0x0F | SI | 58 | 0x3A | : | 101 | 0x65 | e |
| 16 | 0x10 | DLE | 59 | 0x3B | ; | 102 | 0x66 | f |
| 17 | 0x11 | DC1 | 60 | 0x3C | < | 103 | 0x67 | g |
| 18 | 0x12 | DC2 | 61 | 0x3D | = | 104 | 0x68 | h |
| 19 | 0x13 | DC3 | 62 | 0x3E | > | 105 | 0x69 | i |
| 20 | 0x14 | DC4 | 63 | 0x3F | ? | 106 | 0x6A | j |
| 21 | 0x15 | NAK | 64 | 0x40 | @ | 107 | 0x6B | k |
| 22 | 0x16 | SYN | 65 | 0x41 | A | 108 | 0x6C | l |
| 23 | 0x17 | ETB | 66 | 0x42 | B | 109 | 0x6D | m |
| 24 | 0x18 | CAN | 67 | 0x43 | C | 110 | 0x6E | n |
| 25 | 0x19 | EM | 68 | 0x44 | D | 111 | 0x6F | o |
| 26 | 0x1A | SUB | 69 | 0x45 | E | 112 | 0x70 | p |
| 27 | 0x1B | ESC | 70 | 0x46 | F | 113 | 0x71 | q |
| 28 | 0x1C | FS | 71 | 0x47 | G | 114 | 0x72 | r |
| 29 | 0x1D | GS | 72 | 0x48 | H | 115 | 0x73 | s |
| 30 | 0x1E | RS | 73 | 0x49 | I | 116 | 0x74 | t |
| 31 | 0x1F | US | 74 | 0x4A | J | 117 | 0x75 | u |
| 32 | 0x20 | SPACE | 75 | 0x4B | K | 118 | 0x76 | v |
| 33 | 0x21 | ! | 76 | 0x4C | L | 119 | 0x77 | w |
| 34 | 0x22 | " | 77 | 0x4D | M | 120 | 0x78 | x |
| 35 | 0x23 | # | 78 | 0x4E | N | 121 | 0x79 | y |
| 36 | 0x24 | $ | 79 | 0x4F | O | 122 | 0x7A | z |
| 37 | 0x25 | % | 80 | 0x50 | P | 123 | 0x7B | { |
| 38 | 0x26 | & | 81 | 0x51 | Q | 124 | 0x7C | \| |
| 39 | 0x27 | ' | 82 | 0x52 | R | 125 | 0x7D | } |
| 40 | 0x28 | ( | 83 | 0x53 | S | 126 | 0x7E | ~ |
| 41 | 0x29 | ) | 84 | 0x54 | T | 127 | 0x7F | DEL |
| 42 | 0x2A | * | 85 | 0x55 | U | | | |

| | | | |
|---|---|---|---|
| Glyph | å̊ | | |
| Code Points | q | ˚ | ˛ |
| UTF-32 (12 bytes) | 000002A0 | 0000030A | 0000031C |
| UTF-16 (6 bytes) | 02A0 | 030A | 031C |
| UTF-8 (6 bytes) | CA A0 | CC 8A | CC 9C |

FIG. 6

| Plane | Code point | Uni-24 | | | Uni-32 | |
|---|---|---|---|---|---|---|
| | | Code Unit 1 | Code Unit 2 | Code Unit 3 | Code Unit 1 | Code Unit 2 |
| (decimal) | (hexadecimal) | | | | | |
| 0 | 00wxyz | 01 | wx | yz | 01FE | wxyz |
| 1 | 01wxyz | 10 | wx | yz | 10FE | wxyz |
| 2 | 02wxyz | 20 | wx | yz | 20FE | wxyz |
| 3 | 03wxyz | 30 | wx | yz | 30FE | wxyz |
| 4 | 04wxyz | 40 | wx | yz | 40FE | wxyz |
| 5 | 05wxyz | 50 | wx | yz | 50FE | wxyz |
| 6 | 06wxyz | 60 | wx | yz | 60FE | wxyz |
| 7 | 07wxyz | 70 | wx | yz | 70FE | wxyz |
| 8 | 08wxyz | 80 | wx | yz | 80FE | wxyz |
| 9 | 09wxyz | 90 | wx | yz | 90FE | wxyz |
| 10 | 0Awxyz | A0 | wx | yz | A0FE | wxyz |
| 11 | 0Bwxyz | B0 | wx | yz | B0FE | wxyz |
| 12 | 0Cwxyz | C0 | wx | yz | C0FE | wxyz |
| 13 | 0Dwxyz | D0 | wx | yz | D0FE | wxyz |
| 14 | 0Ewxyz | E0 | wx | yz | E0FE | wxyz |
| 15 | 0Fwxyz | F0 | wx | yz | F0FE | wxyz |
| 16 | 10wxyz | FF | wx | yz | FFFE | wxyz |

| Credential (apparent length = 3) | Å | ǭ | 👨‍👩‍👧‍👦 |
|---|---|---|---|
| Unicode String (UTF-16) | 00C5 | 02A0 030A 031C | D83D DC68 200D D83D DC69 200D D83D DC66 200D D83D DC66 |
| Normalized Unicode String (UTF-16) | 0041 030A | 02A0 031C 030A | D83D DC68 200D D83D DC69 200D D83D DC66 200D D83D DC66 |
| Encoded String (Uni-32) | 01FE0041 01FE030A | 01FE02A0 01FE031C 01FE030A | 10FEF468 01FE200D 10FEF469 01FE200D 10FEF466 01FE200D 10FEF466 |
| Encoded Token (effective length = 48 bytes) | 01FE004101FE030A01FE02A001FE031C01FE030A10FEF46801FE200D10FEF46901FE200D10FEF46601FE200D10FEF466 | | |

FIG. 11

APPARATUS AND METHOD FOR CRYPTOGRAPHIC OPERATIONS USING ENHANCED KNOWLEDGE FACTOR CREDENTIALS

CROSS-REFERENCE TO RELATED APPLICATIONS

The present application is a continuation of U.S. patent application Ser. No. 14/838,770, filed 28 Aug. 2015, having the same title, the contents of which are hereby incorporated by reference.

BACKGROUND

1. Field

The present invention relates generally to computer security functions, such as authentication and encryption in computers and networks, and more particularly, to an apparatus and method for cryptographic operations using enhanced knowledge factor credentials.

2. Description of the Related Art

Network devices and other types of computers typically authenticate the identity of a user by verifying one or more of three factors: knowledge, possession, and inherence. Knowledge factor authentication relies on something the user knows, such as account credentials, to authenticate the user before authorizing access to computer and/or network resources. Such credentials, in the form of a username and password, have been used extensively since the early 1960s. Since the advent of credential-based security, interlopers have exploited various weaknesses in these systems, a problem which has reached epic proportions today. Because the vast majority of systems today are protected by single-factor authentication of credentials, the flaws inherent in this scheme have left many systems vulnerable to attack by hackers and criminals.

Typical credential-based security has competing requirements that the password be (1) sufficient complex and long to prevent guessing and (2) memorable enough so that a unique password is used for each system. In practice, users have difficulty meeting both requirements, and tend to use the shortest and simplest password they can remember for most of their accounts. Hackers have caused incalculable damage by exploiting this behavior.

A major shortcoming of credential-based security is the inability to distinguish an attacker who possesses the credentials from the real user. A hacker who can guess or otherwise discover the credentials can compromise the system and freely access the protected data and/or resources, often without detection. Therefore, attackers have spent considerable effort developing creative ways to determine a user's credentials. Many users simply choose a password that is too easily guessed, and tend to use the same password in many systems, compounding the danger of compromise.

Some systems known in the art use a knowledge factor credential to generate or derive an encryption key used to encrypt data in transit, at rest, or both. Such systems are also vulnerable because compromise of the credential can permit an attacker to decrypt the encrypted data and thereby gain unfettered access to the underlying data. As used herein, credential-based security systems include any computer or network security function, e.g., authentication and encryption, which relies at least in part on knowledge factor credentials for their security.

One drawback of conventional credential-based security systems is the relatively small set of characters that are allowed in each credential, which is referred to as a "password" herein. Historically, passwords have been limited to a subset of the American Standard Code for Information Interchange (ASCII), which was created in the 1960s for teletypes. ASCII was based on the English language and originally encoded 33 control characters and 95 printable characters as 7-bit integer numbers. Computers, however, typically store data in 8-bit units called bytes or octets (and multiples thereof, e.g., 16-bit words, 32-bit double words, and 64-bit quad words). An ASCII character is conventionally encoded in a byte using the least significant seven bits, where the most significant bit (MSB) is zero. For example, the number '5' is encoded as 00110101 in binary, or 53 decimal (0x35 hexadecimal). By convention, hexadecimal numbers herein will be prefixed with "0x" or otherwise denoted as such. FIG. 1 is the ASCII table, with the decimal and hexadecimal value for each ASCII character. The ASCII control characters have the code values 0 through 31 and 127 (decimal) and are not usable in many conventional credentials.

Some credential-based security systems known in the art allocate one byte (8 bits) for each password character and allow only a subset of the 95 printable ASCII characters in the password. For example, many systems do not permit the space (ASCII character 32), and certain other punctuation characters. Therefore, an attacker need only test permutations of the allowed characters, disregarding the bytes representing the ASCII control characters and the disallowed printable ASCII characters. There are $m^n$ possible permutations of passwords that are m characters in length formed from a set of n characters, absent restrictions on reuse or repetition of characters. Accordingly, each impermissible character reduces exponentially the number of possible combinations, thereby reducing the strength of conventional security systems. Even those security systems that permit all 95 printable ASCII characters in the password are still significantly disadvantaged because a byte can represent $2^8$, or 256, values, and in these systems, there are 161 byte values that never occur in a password (0-31, 127, and 128-255 decimal). In other words, most passwords known in the art contain at most only 37.1% ($95/256$) of the possible byte values. Hackers take advantage of this relative paucity of values to mount efficient "brute force" password attacks, in which computers try every permutation of passwords containing the permitted password characters. Another common attack relies on "rainbow tables" of precomputed hashes. If an attacker can obtain an account database of password hashes, and the cryptographic hash function used in the security system is known, a table of hashes using the same algorithm can be generated from billions of passwords, which attackers compare to the purloined hashes. If a match is found, the cryptographic hash function has been effectively reversed and the password discovered.

Other state-of-the-art credential-based security systems expand the set of allowable password characters to those in a "code page." A code page is a set of single-byte characters in which the lower set of 128 characters (MSB of zero) are usually the same as in ASCII, and additional characters in the upper set of 128 characters (MSB of one). There are 128 such upper values in a byte, which are typically used for accented characters found in languages other than English and other punctuation, currency, and mathematic symbols. Microsoft® Windows® is an example of an authentication system that allows password characters from several sources, including the active code page and the Windows 1252 code page. FIG. 2 shows the characters in code page 437, which was included with the original IBM PC, and is the active code page when the Microsoft Windows locale is set to United States. There are hundreds of code pages, particularly to represent languages other than English, each of which is incompatible with the others. Although the use of characters from code page 437 for Windows passwords theoretically increases the strength of Windows passwords, in practice very few users take advantage of the additional allowable characters for several reasons. First, virtually no Windows users are aware of this capability, and few users are familiar with the "Alt-codes" that are necessary to enter characters not found on the keyboard. For example, to include 'è' in a code page 437-based password, the user presses the 'Alt' key while entering the number 138 on the numeric keypad. To use a character from the Windows 1252 code page, the user can use an alternate form of the Alt-code, in which a leading zero before the number. For example, to select the euro sign €, the user presses the Alt key while entering the number 0128 on the numeric keypad. This is cumbersome because the user has to memorize the Alt-codes for two different code pages, and as a result, this facility is rarely used. Another reason why Windows passwords do not typically contain extended characters from code pages is that they are only usable on computers with the same active code page. Moreover, such passwords are incompatible with other systems that use a different code page or yet another character encoding scheme and not all credential-based security systems will accept characters with the numeric value 0 to 31 and 127 because of their assignment as nonprintable control codes in ASCII.

A major problem of the hundreds of code pages and disparate character encoding schemes in use is incompatibility. For 8-bit character encoding schemes, a particular character, especially in the upper set of 128 characters, might be encoded differently, or worse yet, not be encoded at all. The result is that the vast majority of conventional credential-based security systems only allow the 95 printable ASCII characters, and more commonly only a subset thereof, because those characters are generally universally available as the lower set of 128 characters in the code page, even in countries or locales where the native language is not English.

In the late 1980s, the Unicode Consortium developed a "unique, unified, universal" character encoding system called Unicode®, which endeavored to encode every character in all scripts used in the world's writing systems. When the Unicode standard was first published in October 1991 (version 1.0), its designers believed that every modern script could be encoded in fewer than 65,536 characters and thus chose to encode Unicode characters as 16-bit integer values called "code points," with a code space of 0x0000-FFFF. The first 256 code points (0x0000-00FF) correspond to the encodings in the ISO 8859-1 8-bit code page, of which the first 128 characters (0x00-7F) are identical to ASCII. The Universal Coded Character Set (UCS) defined in International Standard ISO/IEC 10646 contains the same character encodings as Unicode. Later versions of Microsoft Windows permit the inclusion of certain Unicode characters in the Windows password through a third type of Alt-code, in which the user presses the Alt key, then the + key on the numeric keypad, then the four digit hexadecimal value of the code point using the numeric keypad. Unfortunately, Windows down-converts some Unicode characters selected in this manner to ASCII characters, making this input method inadequate. Because this technique does not display Unicode characters for the user to select, it is not user-friendly and even more rarely used than selecting characters from code pages with other forms of Alt-codes.

In 1996, Unicode 2.0 expanded the code space to the range 0x0000-10FFFF, with 1,114,112 available code points, divided into seventeen planes, numbered 0 to 16, each containing 65,534 code points. The original set of 16-bit Unicode characters is Plane 0, and was renamed the Basic Multilingual Plane (BMP). Presently, only five other planes are in use: Plane 1 (Supplementary Multilingual Plane, 0x10000-1FFFF), Plane 2 (Supplementary Ideographic Plane, 0x20000-2FFFF), Plane 14 (Supplementary Special-purpose Plane, 0xE0000-EFFFF), and Planes 15 and 16 (Supplementary Private Use Areas A and B, 0xF0000-FFFFF and 0x100000-10FFFF, respectively). Each plane is divided into blocks, which are always a multiple of 16 code points in size, and are uniquely named. For example, the first block in the BMP, containing 128 code points from 0x0000 to 007F, is named Basic Latin. Unicode 8.0 contains 262 blocks. The most recent version, Unicode 8.0, encodes over 120,000 characters, with capacity for over 800,000 more.

A key design principle of Unicode is that code points uniquely represent abstract characters, not glyphs. Glyphs are visual graphic forms suitable for rendering or printing, with many possible variants and styles for the same character. For example, within a typeface, e.g., Times New Roman, there are many fonts, such as 12 point regular, where each font is a set of glyphs. Encoding the English alphabet as characters requires 26 uppercase and 26 lowercase characters, but there are thousands of glyphs within the many fonts that represent those characters in print and electronic display. Unicode defines abstract characters that are rendered into glyphs, but does not define the appearance of the glyphs themselves, which can vary by typeface and other factors.

The Unicode repertoire also contains thousands of symbols used in mathematics, science, music, and games as well as characters for emoji, a relatively new form of non-verbal communication that uses small, iconic graphics to convey emotions (emoticons) and other symbols. Unicode contains many characters encoding other elemental glyphs that alter the spelling, meaning, pronunciation, or accentuation of base characters, such as Latin letters. For example, diacritical marks (characters) are glyphs that are added to a letter character, such as the ´ (acute), (grave), and (diaresis) accents. Diacritical marks are but one type of combining mark (also called combining characters and non-spacing marks) in Unicode. Nearly all of the characters in Unicode are graphic characters, that is, characters that either represent a glyph, or cause a visible spacing between glyphs. There are 120,520 graphic characters in Unicode 8.0.

There are 152 format characters in Unicode 8.0, which are invisible but affect the appearance or combination behavior of adjacent graphic characters. For example, the ZERO WIDTH JOINER (ZWJ) format character (by convention, code points are referenced by "U+" followed by their hexadecimal value, here U+200D) is used to indicate that two characters should be connected when ZWJ is placed between them, particularly in Arabic and Indic scripts. Conversely, the ZERO WIDTH NON-JOINER (ZWNJ) format character (U+200C) when placed between two characters indicates that those characters should not be connected, e.g., to break a cursive connection in Arabic scripts. ZWNJ can also be used to prevent ligatures from forming, for example, in certain German words. Many of the Unicode format characters affect the behavior of word, line and paragraph breaks, and other formatting.

There are 65 control codes in Unicode, inherited from the encodings in ISO 8859-1, ranging from U+0000 to U+001F and from U+007F to U+009F. Additionally, there are 66 values never used for encoding characters in Unicode: from U+FDD0 to U+FDEF in the BMP and any code point ending in the values 0xFFFE or 0xFFFF.

Unicode also defines three Private Use Areas (PUA): 6400 code points in the range U+E000-F8FF in the BMP and the entirety of planes 15 and 16, for private-use characters, in which software developers and end-users can define their own code points. In some cases, private-use characters defined within the PUAs are used by a single organization, but they may be adopted more broadly by the Unicode community. Because Unicode is an evolving character set, widely-used private-use characters can be formally adopted as an assigned code point.

There is not a one-to-one correspondence between Unicode characters and glyphs because what a user perceives as a single glyph can be comprised of several elemental glyphs, each encoded as a separate Unicode character. What a user perceives as a single character is known as a grapheme, defined by Unicode as "a minimally distinctive unit of writing noninfringement the context of a particular writing system." One of the guiding precepts of Unicode was the ability to combine multiple abstract characters into one grapheme, which will generally be rendered as one glyph image. In general, any base character can be combined with any arbitrary sequence of combining marks into a combining character sequence (CCS). A CCS is formally defined as a base character followed by one or more (1) combining marks; (2) ZWJs; or (3) ZWNJs, which are combined into one glyph image by the rendering engine. Unicode also contains many precomposed forms, in which a single code point encodes a base character (or two, a digraph) with one or more diacritical marks for the most common combinations, such as (LATIN SMALL LETTER U WITH DIARESIS AND CARON, U+01DA). It is always possible to represent the same glyph using the code points for the base character and combining marks. For many glyphs, there are two or more sets of code points that are canonically equivalent, that is, even though the constituent code points and/or their sequence differ, they represent the same displayed glyph. For example, there are three canonically equivalent code point sequences for the glyph Å: (1) U+0005 (LATIN CAPITAL LETTER A WITH A RING ABOVE); (2) U+212B (ANGSTROM SIGN); and a combining sequence of two code points: U+0041 (LATIN CAPITAL LETTER A) and U+030A (COMBINING RING ABOVE). The latter sequence is an example of the decomposed form of a glyph, i.e., a CCS that contains the maximal length character sequence for a given glyph. The combining character sequence is one form of grapheme cluster, which is an atomic, user-perceived character (grapheme) comprised of a base character followed by one or more non-spacing marks. Other examples of grapheme clusters are sequences of Hangul Jamo characters to represent Hangul syllables in Korean, and Indic consonant clusters.

The Unicode Standard defines two types of character equivalence: canonical equivalence, and compatibility equivalence. As described above, canonical equivalence is exact equivalence between characters or sequence of characters, whereas compatibility equivalence is weaker and may result in subtle visual differences between the resulting glyphs. Unicode further provides formally-defined normalization forms for both composed and decomposed sequences of code points, and rules to guarantee canonical equivalence between them. Normalization Form D (NFD) performs a canonical decomposition of each user-perceived character in a Unicode string by expanding it into its decomposed character components, and placing any combining marks into a well-defined order. Normalization Form C (NFC) performs a canonical composition by first performing NFD, then processing the fully decomposed and canonically ordered string by searching for pairs of characters that can be replaced by canonically equivalent composite characters, resulting in a fully composed but canonically equivalent string. Unicode also provides normalization forms for compatibility equivalence: Normalization Form KC (NFKC), which performs compatibility decomposition followed by canonical composition, and Normalization Form KD (NFKD), which performs compatibility decomposition. The Unicode Standard includes normalization charts, which define the NFC, NFD, NFKC, and NFKD normalizations.

Unicode defines three Character Encoding Forms (CEF), which map from the set of integers (code points) encoding characters to code units, which are integers occupying a specified binary width in a computer architecture, such as an 8-bit byte or a 16-bit word. The supported CEFs are Unicode Transformation Format (UTF)-8, -16, and -32. UTF-8 (8-bit) and UTF-16 (16-bit) are variable-length encoding forms because one or more code units are necessary to represent the full range of code points. UTF-8 requires one, two, or three code units to represent code points in the BMP, and four code units to encode code points in the supplementary planes. UTF-16 requires one code unit to encode code points in the BMP, and two code units to encode code points in the supplementary planes using 2,048 surrogate pairs, where the high surrogate H and low surrogate L define the code point according to the following equation: $10000_{16}+(H-0xD800)\times0x400+(L-0xDC00)$=code point value. High surrogates range from 0xD800-DBFF and low surrogates range from 0xDC00-DFFF. Surrogate pairs are another form of grapheme cluster. UTF-32 is a fixed-length 32-bit code unit that encodes any code point directly in a single code unit.

There is an additional encoding scheme in Unicode, the Character Encoding Scheme (CES), which defines a reversible transformation of sequences of code units (one of the UTF-8, UTF-16, or UTF-32 CEFs) to serialized sequences of bytes. There are seven supported character-encoding schemes in Unicode: UTF-8, UTF-16, UTF-16BE, UTF-16LE, UTF-32, UTF-32BE, and UTF-32LE. The BE and LE variants refer to Big Endian and Little Endian, respectively, defining how the processor architecture maps multi-byte integers to memory locations. In Big Endian architectures, the most-significant byte is stored at the lower address, while in Little Endian architectures, the least-significant byte is stored at the lower address. The UTF-16 and UTF-32 character encoding schemes require a byte order mark (BOM) (code point U+FEFF) at the head of the byte stream to unambiguously define the byte order of the code units that follow.

Existing conventional knowledge factor security schemes typically store the username or account in plaintext form (i.e., not encrypted) in a database field configured as the primary key for a table of users or accounts. In such systems, the password, comprised of 8-bit characters, is typically input to a cryptographic hash function, such as MD5 or SHA-1. The message digest, or hash, output from the hash function is compared to the stored hash in the account database. If they match, the user is authenticated and access is granted. As is known in the art, cryptographic hash functions used for credential-based security systems have several desirable properties: pre-image resistance, second pre-image resistance, and collision resistance. The state of the art in conventional credential-based security is the application of a key-stretching algorithm, such as RSA's Password-Based Key Derivation Function 2 (PBKDF2), published as RFC 2898 by the Internet Engineering Task Force. PBKDF2 has five input parameters: (1) a pseudo-random function taking two input parameters with a fixed output length (i.e., a cryptographic hash function); (2) a password or passphrase; (3) a cryptographically random salt; (4) the number of iterations of the algorithm; and (5) the desired length of the derived key output by the algorithm. The output of the PBKDF2 function is a derived key usable for symmetric encryption, but it can also be considered a message digest and stored for comparison to a generated digest in authenticating a user.

There exists a need, not met by the state of the art, or recognized by those of skill in the art, to replace existing knowledge factor security schemes by enhanced security systems incorporating any defined multi-byte characters such as Unicode characters, and in particular, Unicode grapheme clusters and combining character sequences, in knowledge factor credentials, e.g., usernames and passwords. Further, there is a need to address various usability issues that arise when users express credentials in encodings with relatively large character sets. These and/or other shortcomings of traditional techniques are addressed below.

SUMMARY

The following is a non-exhaustive listing of some aspects of the present techniques for enhancing knowledge factor security systems by supporting Unicode characters, grapheme clusters and combining character sequences in knowledge factor credentials, such as usernames, passphrases, and passwords. These and other aspects are described in the following disclosure.

Experts are beginning to appreciate that existing knowledge factor credential-based security systems are inadequate to meet the unprecedented threats to computers, databases and networks from the growing number of attackers, which include criminals, hackers, interlopers and even governments. Despite the many advances in computer technology generally and in the field of cryptography over the last fifty years, the use of existing password-based security systems has barely evolved from the time passwords were first used, reportedly at the Massachusetts Institute of Technology in the early 1960s.

A method of some embodiments of one of the present inventions results in credentials that meet what were previously mutually-exclusive goals for knowledge factor security systems: (1) easy to remember by users; (2) unique for each account or site; and (3) sufficiently strong to prevent guessing. The invention has a startling result: credentials, from the user's perspective, are significantly shorter and more memorable, yet the effective length of the credential is significantly longer than anything known in the art. The breakthrough of the invention is providing the user the ability to use any arbitrary multi-byte character, and sequences of such characters (e.g., grapheme clusters or combining character sequences) in enhanced credentials, combined with additional transformation of the enhanced credential in accordance with the invention that results in a transformed binary sequence so long and pseudo-random that it is impervious to all known attack methods. At the same time, the invention allows users to have far more memorable credentials, because users are allowed—for the first time—to use any characters they desire in their credentials, including emojis and characters from any defined writing system, ancient and modern.

Some aspects include a method for enhanced security operations performed by devices with processing capability, that is, any device that contains a CPU, microprocessor, microcontroller, field-programmable gate array (FPGA), application-specific integrated circuit (ASIC) or other integrated circuit able to execute instructions implementing the invention. As non-limiting examples, such devices include computing devices, such as a desktop computer, notebook computer, server, tablet, smartphone, personal digital assistant (PDA), and other mobile device. In addition, devices that benefit from the invention include any device with computing capabilities and the need for computer security functions, such as set-top boxes, digital entertainment systems, network appliances, appliances and control systems.

Some aspects include a tangible, non-transitory, machine-readable medium storing instructions that when executed by a data processing apparatus cause the computing apparatus to perform operations including the above-mentioned method.

Some aspects include a system, including: one or more processors; and memory storing instructions that when executed by the processors cause the processors to effectuate operations of the above-mentioned method.

BRIEF DESCRIPTION OF THE DRAWINGS

The above-mentioned aspects and other aspects of the present techniques will be better understood when the present application is read in view of the following figures in which like numbers indicate similar or identical elements:

FIG. 1 depicts the American Standard Code for Information Interchange (ASCII) in tabular form.

Figure 2:
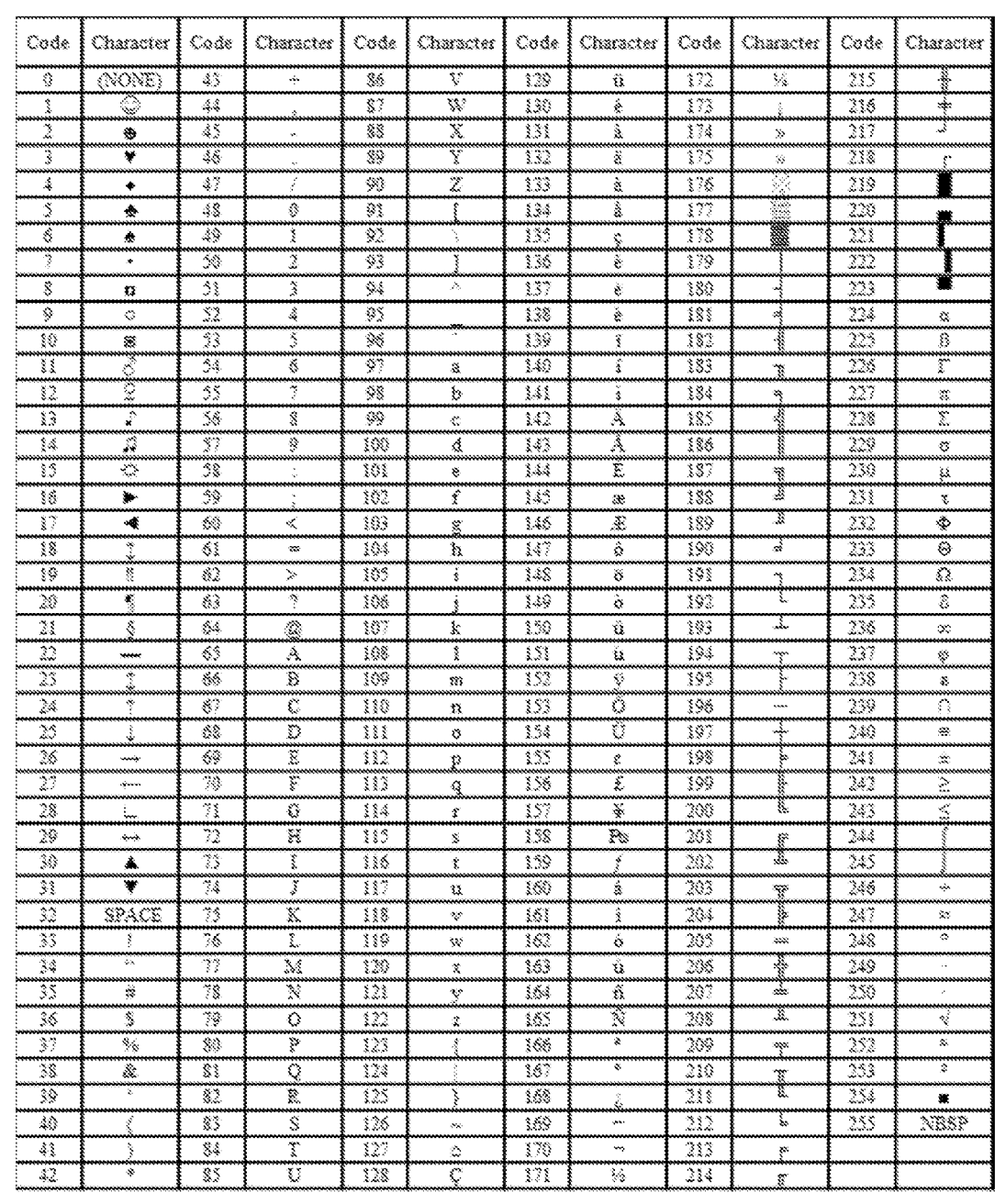

FIG. 2 depicts OEM code page 437 in tabular form.

FIG. 6 depicts an exemplary glyph composed in accordance with the invention, comprised of a base character and two arbitrary combining marks.

FIG. 10 depicts how Unicode code points in each of the sixteen Unicode planes are encoded in accordance with the Uni-24 and Uni-32 character encoding schemes (CES) of the invention.

FIG. 11 illustrates how an enhanced credential comprised of three exemplary graphemes formed in accordance with the invention is transformed into an encoded token.

Figures 3, 4:
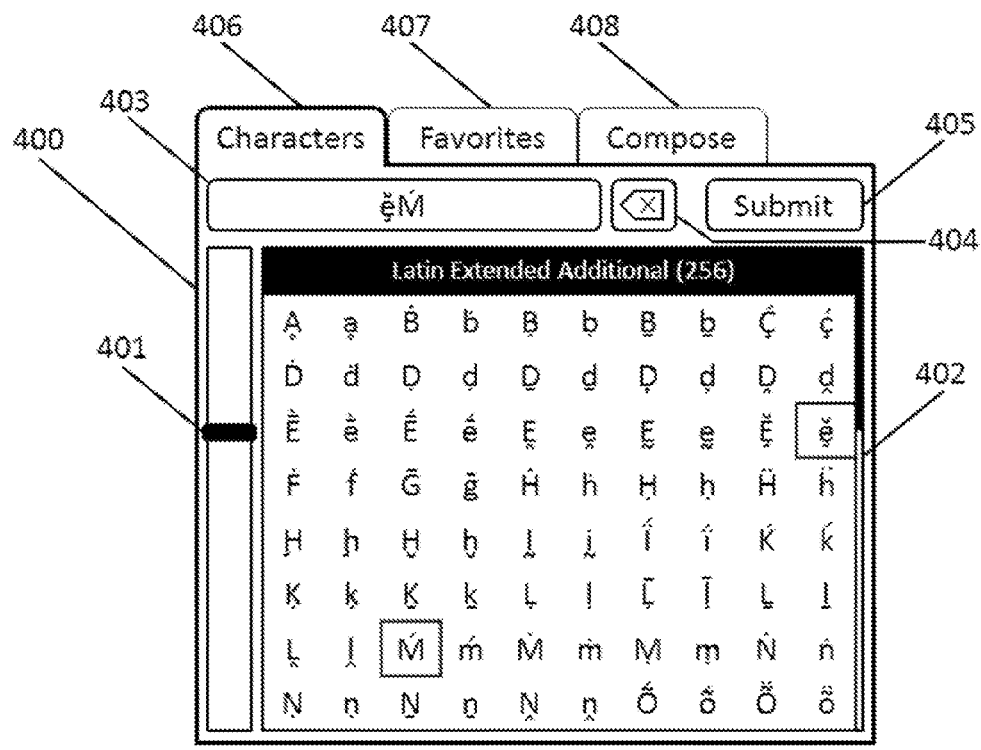
FIG. 3 depicts an exemplary Unicode emoji grapheme cluster with its constituent code points and their respective encoding in character encoding forms UTF-8, UTF-16, and UTF-32.
FIG. 4 depicts an exemplary user interface for selecting Unicode characters from any arbitrary Unicode block in accordance with an embodiment of the invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventor had to both invent solutions and, in some cases just as importantly, recognize problems overlooked (or not yet foreseen) by others in the fields of computer and network security. Indeed, the inventor wishes to emphasize the difficulty of recognizing those problems that are nascent and will become much more apparent in the future should trends in industry continue as the inventor expects. Further, because multiple problems are addressed, it should be understood that some embodiments are problem-specific, and not all embodiments address every problem with traditional systems described herein or provide every benefit described herein. That said, improvements that solve various permutations of these problems are described below.

The present invention solves one of the most challenging problems in computer security: how to strengthen credential-based security systems sufficiently to withstand the myriad attacks today, while simultaneously facilitating a user's ability to memorize a unique credential, or set of credentials, for every system requiring one or more credentials. It has proven to be an elusive goal until the advent of the invention disclosed herein. The Unicode character set is advantageously used as the source of characters and character sequences (e.g., grapheme clusters) for the enhanced security operations of the invention, but other multi-byte character sets can be used in place of Unicode. Unicode has several benefits over other known multi-byte character sets. For example, Unicode is the most universally and widely adopted character set worldwide, and is the native character encoding system for major operating system vendors Microsoft Corporation and Apple Inc. Unicode is also the default string encoding for the Java and C# programming languages, and is supported in every modern programming language. Moreover, Unicode evolves and expands with each release, while the code points from previous versions remain stable. Once a code point is added to the Unicode repertoire, it is permanent, though occasionally code points are deprecated. Another key advantage of Unicode is the formalized definitions of canonical equivalence and normalization forms, which guarantee that regardless of the platform, architecture, or operating system of devices compliant with the same version of the Unicode Standard will create the same Unicode string from the same sequence of encoded glyphs.

Enhanced credentials formed in accordance with the invention disclosed herein have two defining metrics: apparent length (in number of graphemes or user-perceived characters) and effective length, the length of the encoded token formed from the credential in bytes. The ideal knowledge factor credential has a low apparent length, for ease of memorization, and a high effective length, for strength and concomitant resistance to brute force, rainbow table, and other attacks. Whereas conventional credentials generally have the same apparent and effective lengths because they contain only 8-bit encoded characters, the enhanced credentials associated with the invention have an effective length much greater than their apparent length.

FIG. 3 illustrates this key advantage of the invention in table 300, namely that one grapheme cluster of a single user-perceived emoji 301 is actually comprised of the seven Unicode code points depicted in row 302: four pictographs of a man, woman, and two boys combined with three ZWJ code points between them. In this example, the apparent length of this grapheme cluster in an enhanced credential is 1 character, but the effective length varies from 22 to 28 bytes depending on the character encoding form (CEF). Row 303 in FIG. 3 illustrates how the code points of the grapheme cluster are encoding using the UTF-32 CEF. Because the UTF-32 CEF encodes each code point in a 32-bit code unit, the grapheme cluster encoded by UTF-32 has an effective length of 28 bytes. Row 304 in FIG. 3 illustrates how the code points of the grapheme cluster are encoding using the UTF-16 CEF. The UTF-16 CEF encodes each code point in one or two 16-bit code units, depending on the plane of the code point. The four pictograph code points are in plane 1, so they are encoded as surrogate pairs, whereas the ZWJ code point is in plane 0, the BMP. As depicted in row 304, the grapheme cluster encoded in UTF-16 has an effective length of 22 bytes. Row 305 in FIG. 3 illustrates how the code points of the grapheme cluster are encoding using the UTF-8 CEF. The UTF-8 CEF encodes each code point in one to four 8-bit code units, depending on the plane and value of the code point. The four pictograph code points are in plane 1, so they are each encoded by four code units, whereas the ZWJ code point (U+200D) is within the range U+0800-U+FFFF in the BMP (plane 0), and is therefore encoded by three code units. As depicted in row 305 in FIG. 3, the grapheme cluster encoded in UTF-8 has an effective length of 24 bytes.

The effective length of this one grapheme cluster 301 in any of these three CEFs greatly exceeds the length (in bytes) of virtually all conventional passwords in use today. Because of the shortcomings in the prior art, there is no distinction between the apparent and effective length of a conventional credential because they are generally identical. In contrast, there are effectively two credentials formed in accordance with the invention: the credential apparent to the user, and the encoded token created by the method of the invention, which is preferably input to one or more cryptographic functions.

The exemplary grapheme cluster in FIG. 3 illustrates the advantageous use of one or more emojis in the enhanced credential of the invention. Emojis are instantly memorable because they convey a significant amount of information in one pictograph, and as demonstrated in FIG. 3, they have the potential to add significantly to the effective length of the encoded token. Emoji symbols have two additional properties that promote their use with the invention. The first is that many emoji characters are followed by one of two Unicode variation selector code points, U+FE0E (VARIATION SELECTOR-15 (VS-15)) to indicate a text presentation, or U+FE0F (VARIATION SELECTOR-16 (VS-16)) to indicate an emoji presentation. Second, as of Unicode 8.0, there are five emoji modifier characters that provide a range of skin tones for human emoji based on the Fitzpatrick scale, a standard in dermatology. These code points are U+1F3FB (Type 1-2), U+1F3FC (Type 3), U+1F3FD (Type 4), U+1F3FE (Type 5), and U+1F3FF (Type 6). The variation selector and/or skin tone modifier, if employed, follow the emoji code point. The addition of both a variation selector and skin tone modifier add up to 8 bytes per emoji to the effective length of the encoded token.

A concomitant advantage of the use of grapheme clusters and composed character sequences in the invention is that each grapheme cluster is a sequence of highly correlated bytes with zero correlation to surrounding characters or grapheme clusters. This is advantageous because moving a grapheme cluster even one user-perceived position in the credential results in the movement of the entire sequence of bytes encoding the grapheme cluster. For example, if the single grapheme cluster illustrated in FIG. 3 is shifted one position forward or backward in the credential, it results in the movement of a block of 22, 24, or 28 bytes within the encoded credential, depending on the CEF. Accordingly, an attacker attempting a brute-force attack on an enhanced credential of the invention must necessarily try not just all characters, but also all possible grapheme clusters, and in all positions of the enhanced credential. Because of the high effective length of enhanced credentials, and the strong correlation within grapheme clusters, a brute-force attack is considered computationally infeasible.

These advantages, it should be noted, are not all offered by all embodiments. The various inventions described herein are independently useful. For instance, some use cases do not use emojis (e.g., by composing a grapheme cluster from characters from several blocks). In another example, some use cases do not use grapheme clusters, as uncomposed characters from a large set of characters can expand the search space for brute force password attacks sufficiently in some implementations.

In accordance with some embodiments, there are a variety of ways that a user can select Unicode characters, including individual code points, combining character sequences, and grapheme clusters. In one aspect of the invention, the user selects Unicode characters from a keyboard attached to, in wireless communication with, or integral to the user's device. For example, the user can select one or more Unicode characters from a display-based keyboard, sometimes called a "soft" or software-driven keyboard that is rendered on the device's display. In this embodiment, the user selects one or more Unicode characters from the displayed keyboard using a pointing device such as a mouse or trackpad, or the user's finger or a stylus in the case of a touch-sensitive display, each of which is referred to as a pointing device herein. In a variant of this embodiment, the device has two or more keyboards from which one or more Unicode characters can be selected, particularly from different Unicode blocks mapped to different locales. For example, a keyboard for the U.S. English locale will be mapped to the Basic Latin Unicode block (U+0000-007F), whereas a keyboard for the Ukrainian locale will be mapped to the Cyrillic Unicode block (U+0400-04FF).

In some embodiments, the invention provides the user with the ability to select one or more Unicode characters from a displayed set of Unicode characters, which can include individual code points, combining character sequences, and grapheme clusters from any block defined in the Unicode Standard. In these embodiments, depicted by way of an example in FIG. 4, the user selects one or more Unicode characters from the displayed credential input user interface 400 by selecting Characters tab 406, which selects multi-byte character input mode. In this mode, the user moves slider 401 with a pointing device to select the desired Unicode block. The position of slider 401 within its range indicates the approximate position of the selected block within the number of supported blocks, which can include all defined Unicode blocks or fewer. As the user moves slider 401, the contents of the selected block are displayed in character user interface 402, with the name of the selected block and number of code points therein displayed in the header of character user interface 402. Character user interface 402 displays the code points in each selected block, and responds to a pointing device selecting the cell of an individual character therein by appending the selected character to the credential input field 403. Because the invention, in some embodiments, supports all Unicode code points, where a selected character is appended in credential input field 403 depends on whether the selected character is from a script that is read from left to right, or from right to left, because Unicode characters have an intrinsic directionality property. The user can iterate within the selected block in character user interface 402 by directly moving the contents of character user interface 402 vertically with a pointing device, or by moving the slider of character user interface 402, shown along the right side, with a pointing device.

As depicted in FIG. 4, the user has selected two characters from the Latin Extended Additional Unicode block, indicated by the highlighted cells in character user interface 402, and accordingly the selected characters are displayed in credential input field 403. Credential input field 403, in some embodiments, is also responsive to a pointing device, permitting the user to select one or more characters therein for either deletion by pressing backspace button (or key) 404 or moving within the credential by dragging the selected character(s) to a new position in the credential input field. When the user has finished selecting characters for the enhanced credential in credential input field 403, the user presses Submit button (or key) 405, which initiates further processing of the credential, as detailed below.

In some cases, the user interface functionality described with reference graphical user interfaces may be provided by process executing on a computing device, for instance a mobile computing device, an embedded computing device, or a desktop computing device, like those described below with reference to FIG. 18. In some cases, such processes may include a plurality of event handlers that receive events corresponding to user input, like on-touch events, gestures, and touch-release events. Routines mapped to these events may be called by the handler to provide the user-requested functionality. In some cases, such routines may be passed other parameters of the event, like coordinates of the event on the display, by which the event may be mapped by the routine to a particular aspect of the request, like a character selected by the user by touching a location on the screen where that character appears.

It should be appreciated by those skilled in the art that FIG. 4 merely illustrates one exemplary user interface that facilitates the selection of any arbitrary Unicode character or grapheme cluster for inclusion in the enhanced credential of the invention, and is but one of myriad ways to accomplish this function, all of which are included within the spirit and scope of the invention. For example, in place of Characters tab 406, Favorites tab 407, and Compose tab 408, character selection user interface 400 could include buttons, keys, or any other user interface element or field to select the input mode of credential input user interface 400. Moreover, the invention is not limited to the manner of displaying and selecting characters depicted in FIG. 4. The user may enter enhanced credentials into any standard user interface input field or data entry field as known to those of skill in the art, and such input field may or may not show the Unicode characters and grapheme clusters selected by the user. In some embodiments, credential input field 403 shows an entered Unicode character momentarily after selection by the user for confirmation, and then replaces the character with an asterisk, dot, or other symbol to obscure the credential as it is entered. Character selection may take many forms, including identifying the character by touching the character on a screen, composing the character by identifying several constituent characters, or uttering an audible phrase mapped by voice recognition software executed by the computing device to a given character.

In one of the embodiments of the invention, the user may optionally (which is not to imply that other features are not also optional) select a subset of Unicode characters and grapheme clusters from one or more Unicode blocks to thereby create a user-defined set of characters. The user can more efficiently select the characters in his or her enhanced credential by using the user-defined set, while still maintaining a high level of security. Even if an interloper gains access to the user-defined set, there are a sufficiently large number of characters and grapheme clusters contained in the set, e.g., at least 256, such that mounting a brute-force attack is still computationally infeasible.

Figure 5:
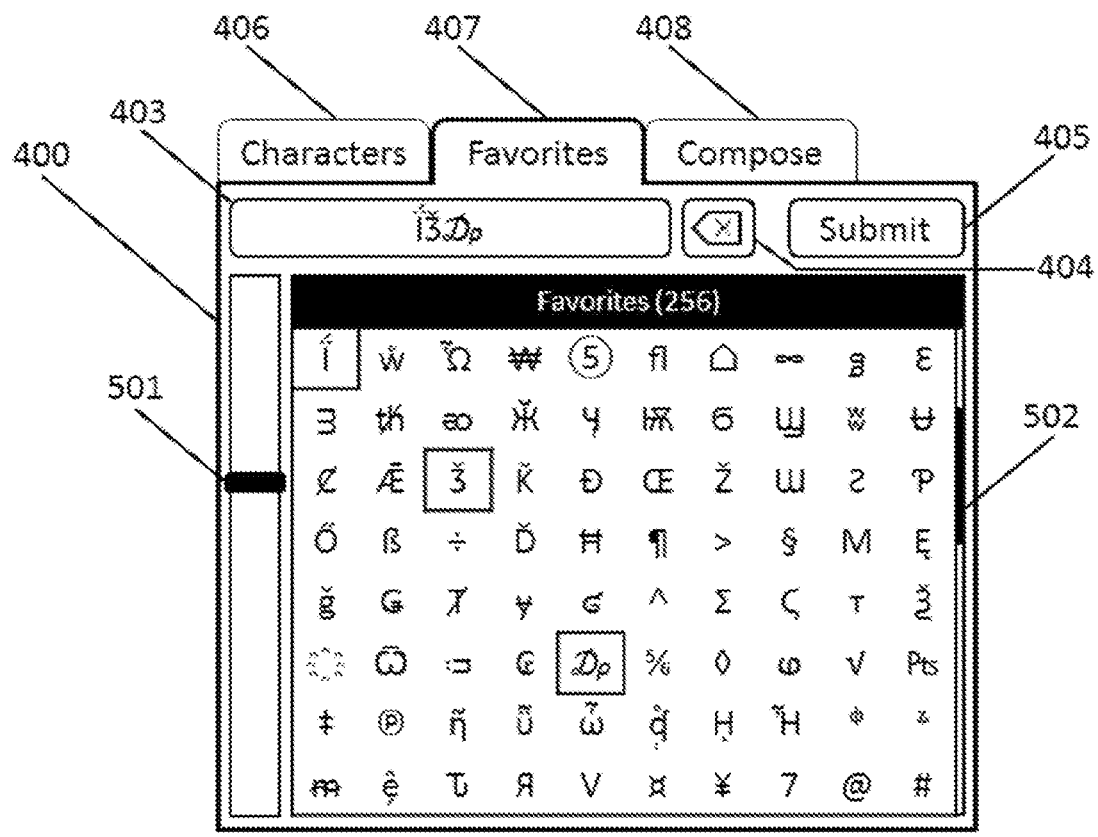
FIG. 5 depicts an exemplary user interface for selecting Unicode characters from a user-defined set of characters in accordance with an embodiment of the invention.

In some embodiments consistent with a user interface depicted by FIG. 5, the user selects Favorites tab 407 of credential input user interface 400 with a pointing device, which displays slider 501 and user-defined character user interface 502. As the user moves slider 501, the contents of the selected user-defined block are displayed in user-defined character user interface 502, with the name of the selected user-defined block and number of code points therein displayed in the header of user interface 502. User interface 502 displays the code points in each selected user-defined block, and responds to a pointing device selecting the cell of an individual character therein by appending the selected character to the credential input field 403. The user can iterate within the selected block in user interface 502 by directly moving the contents of character user interface 502 vertically with a pointing device, or by moving the slider of character user interface 502, shown along the right side, with a pointing device. As depicted in FIG. 5, the user has selected three characters from the Favorites block, indicated by the highlighted cells in user interface 502, and accordingly the selected characters are displayed in credential input field 403. There are several ways that the user can select which characters and grapheme clusters are included in the user-defined character sets. In one embodiment, whenever the user selects a character or grapheme cluster from the Characters input mode, that character is automatically added to the user-defined set, even if that character is then deleted from the credential input field. In another embodiment, the user can iterate through the Characters input mode to select characters to add to the user-defined set. In another embodiment, the security system of the invention automatically selects a pseudo-random set of Unicode characters and grapheme clusters from a plurality of blocks, in addition to those selected by the user, or instead of the user selecting any characters. The user can create one or more user-defined sets of characters and grapheme clusters in accordance with the invention.

In some embodiments, the invention provides a user interface from which the user selects a base character from any Unicode block, such as ɋ (U+02A0, LATIN SMALL LETTER Q WITH HOOK), and then selects one or more Unicode combining marks, such as diacritical marks, to compose a new grapheme cluster. As long as the resulting grapheme cluster is a valid Unicode character sequence, it is of no consequence that the resulting glyph image is not actually used in any writing system, in some embodiments. Indeed, if the composed grapheme cluster is not used in any known script, it is far stronger from a security standpoint, because an attacker would be unlikely to include such a character sequence in a brute-force attack.

FIG. 6 illustrates a composed Unicode sequence in accordance with some embodiments of the invention in table 600. Glyph 601 is a single composite character, which in this example results from the exemplary composed grapheme cluster depicted in FIG. 6, in which ɋ (U+02A0, LATIN SMALL LETTER Q WITH HOOK) is the base character joined with combining diacritical marks ° (U+030A, COMBINING RING ABOVE) and ̜ (U+031C, COMBINING LEFT HALF RING BELOW). The three code points in this exemplary grapheme cluster are shown graphically in row 602, each of which is a separate glyph that are rendered together as glyph 601. Importantly for this embodiment, the grapheme cluster in FIG. 6 is a valid Unicode character sequence even if not used in any script, which makes its inclusion in an enhanced credential advantageous from the standpoint of randomness and unpredictability. Row 603 in FIG. 6 illustrates how the code points of the grapheme cluster are encoding using the UTF-32 CEF. Because the UTF-32 CEF encodes each code point in a 32-bit code unit, the grapheme cluster encoded by UTF-32 has an effective length of 12 bytes. Row 604 in FIG. 6 illustrates how the code points of the grapheme cluster are encoding using the UTF-16 CEF. The UTF-16 CEF encodes each code point in one or two 16-bit code units, depending on the plane of the code point. Each of the code points are in the BMP, so they are encoded with a single code unit each. As depicted in row 604, the grapheme cluster encoded in UTF-16 has an effective length of 6 bytes. Row 605 in FIG. 6 illustrates how the code points of the grapheme cluster are encoding using the UTF-8 CEF. The three code points are within the range U+0080-U+07FF in the BMP, and are therefore each encoded by two code units. As depicted in row 605 in FIG. 6, the grapheme cluster encoded in UTF-8 has an effective length of 6 bytes. In contrast, the grapheme cluster has an apparent length of one character, imposing a relatively low cognitive load on the user. For instance, a movement of a cursor by one space would cause the cursor to translate past the single composite character 601. Some credentials may include several such characters, each being a single composite character with multiple constituent characters.

Figure 7:
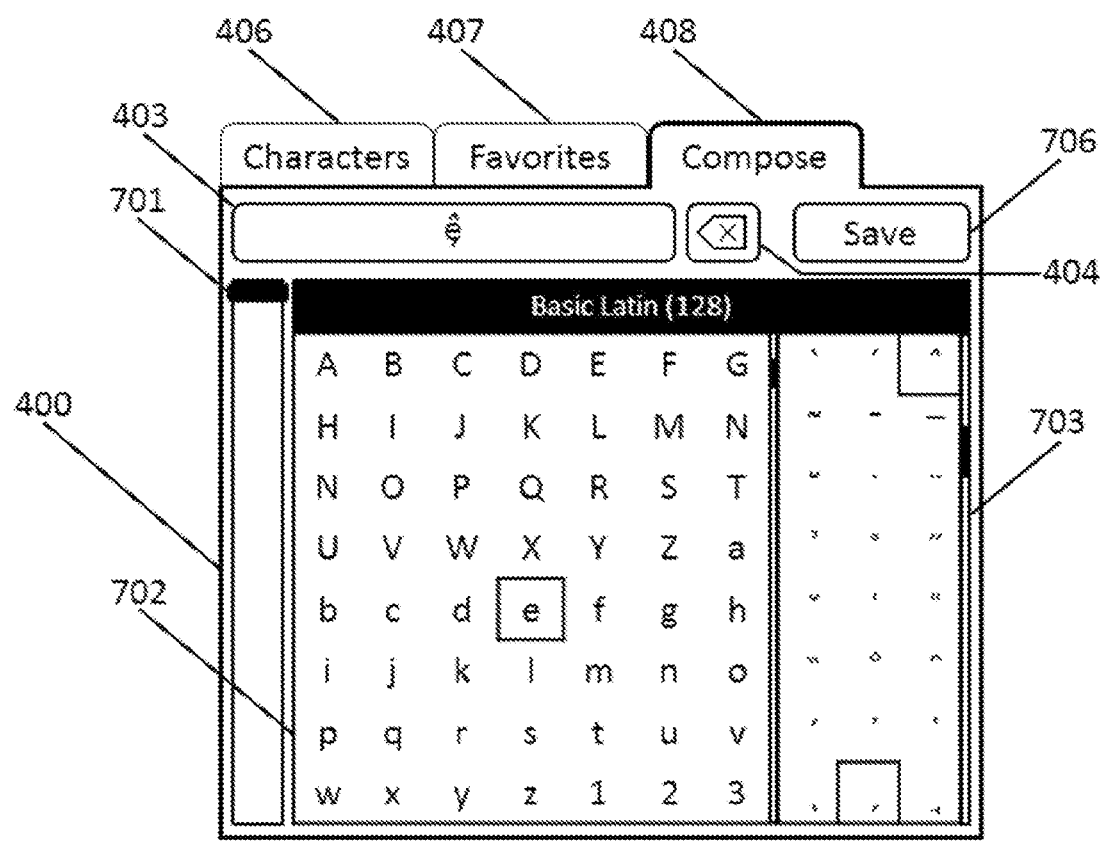
FIG. 7 depicts an exemplary user interface for composing grapheme clusters from Unicode characters in accordance with an embodiment of the invention.

FIG. 7 depicts the grapheme composer input mode of some embodiments of credential input user interface 400, which facilitates the user creation of arbitrary grapheme clusters as described above. In the exemplary embodiment depicted in FIG. 7, the user selects Compose tab 408 with a pointing device, which displays slider 701, base character user interface 702, and combining character user interface 703. As the user moves slider 701, the contents of the base character block are displayed in base character user interface 702, with the name of the selected base character block and number of code points therein displayed in the header of user interface 702. User interface 702 displays the code points in each selected base character block, and responds to a pointing device selecting the cell of an individual character therein by appending the selected character to the credential input field 403. In some embodiments, the user can iterate within the selected block in user interface 702 by directly moving the contents of character user interface 702 vertically with a pointing device, or by moving the slider of character user interface 702, shown along the right side, with a pointing device. Once the user has selected a base character from base character user interface 702, combining character user interface 703 is enabled, permitting the user to select one or more combining characters, which are combined with the selected base character to compose a new grapheme cluster. As depicted in FIG. 7, the user has selected one base character and two combining characters, indicated by the highlighted cells in user interfaces 702 and 703. The invention, in some embodiments, renders the grapheme cluster as a single user-perceived character in credential input field 403, as illustrated in FIG. 7.

When the user has finished composing the grapheme cluster, the user presses Save button (key) 706, which saves the grapheme cluster to the user-defined character set, and appends the grapheme cluster to credential input field 403, thereby selecting the character. Nearly all of the 120,000+ graphic characters defined in Unicode are usable as base characters in grapheme clusters (including, numbers, symbols, pictographs and emojis), and there are more than 150 combining diacritical marks defined in Unicode, resulting in an extremely large number of permutations that can be created by the grapheme composer of the invention. It should be appreciated by those of skill in the art that there is a practical limit to the number and type of combining marks that can be combined with a base character in the grapheme composer; generally one combining mark above the base character and one below, in order for the grapheme cluster to be rendered as a glyph image correctly. In one embodiment the grapheme composer permits the selection of only the maximum number of each type of combining mark that can be correctly rendered. Since the primary object of the grapheme composer is enhancing the security of the credential-based security system, however, in another embodiment the grapheme composer permits the user to select any number of unique combining marks to be joined with a base character. In yet another embodiment, the grapheme composer facilitates the selection of any number of combining marks, including multiple identical combining marks, which are permitted by the Unicode standard and enhance the strength of the enhanced credential. The number of supported characters may be selected based on tradeoffs between ease of user selection of characters and the desired strength of passwords, the ease of user selection tradeoffs being made less severe by some embodiments of the user interfaces described herein.

Figure 8:
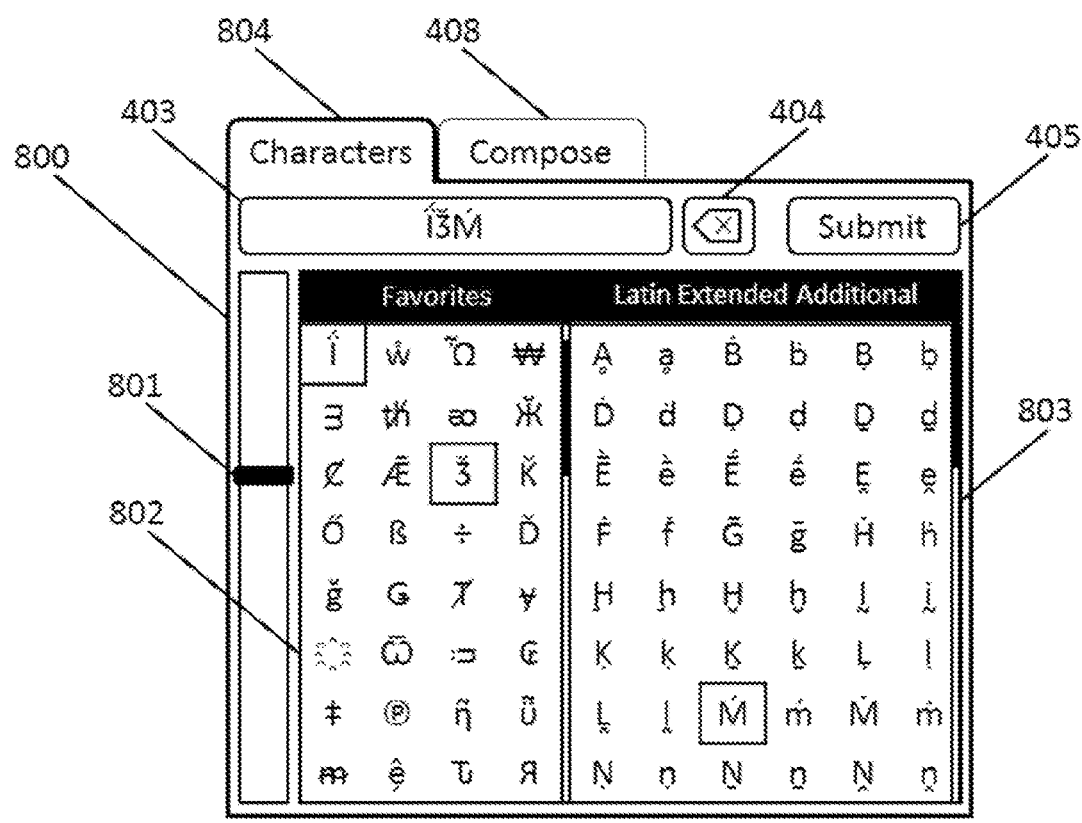
FIG. 8 depicts an exemplary user interface for selecting Unicode characters in accordance with an embodiment of the invention from either a user-defined set of characters or any arbitrary Unicode block.

In some embodiments consistent with an example user interface of FIG. 8, credential input user interface 800 combines the multi-byte character selection and user-defined character set user interfaces in Characters tab 804. The user selects one or more Unicode characters from the displayed credential input user interface 800 by selecting Characters tab 804. In this mode, the user moves slider 801 with a pointing device to select the desired Unicode block in character user interface 803. The position of slider 801 within its range indicates the approximate position of the selected block within the number of supported blocks, which can include all defined Unicode blocks or fewer. As the user moves slider 801, the contents of the selected block are displayed in character user interface 803, with the name of the selected block displayed in the header of character user interface 803. Character user interface 803 displays the code points in each selected block, and responds to a pointing device selecting the cell of an individual character therein by appending the selected character to the credential input field 403. Because the invention, in some embodiments, supports all Unicode code points, where a selected character is appended in credential input field 403 depends on whether the selected character is from a script that is read from left to right, or from right to left, because Unicode characters have an intrinsic directionality property. The user can iterate within the selected block in character user interface 803 by directly moving the contents of character user interface 803 vertically with a pointing device, or by moving the slider of character user interface 803, shown along the right side, with a pointing device. The user can also select characters from one or more user-defined blocks in user-defined character user interface 802 in the same fashion as selecting characters from character user interface 803. In this exemplary depiction, user-defined character user interface 802 contains a combination of letters, symbols, and the composed grapheme illustrated in FIG. 7 (in the last displayed row of user interface 802). The operation of user-defined character user interface 802 is similar as described with respect to FIG. 5. As depicted in FIG. 8, the user has selected two characters from the Favorites user-defined block and one character from the Latin Extended Additional block, indicated by the highlighted cells in user-defined character user interface 802 and character user interface 803, and accordingly the selected characters are displayed in credential input field 403.

Figure 9:
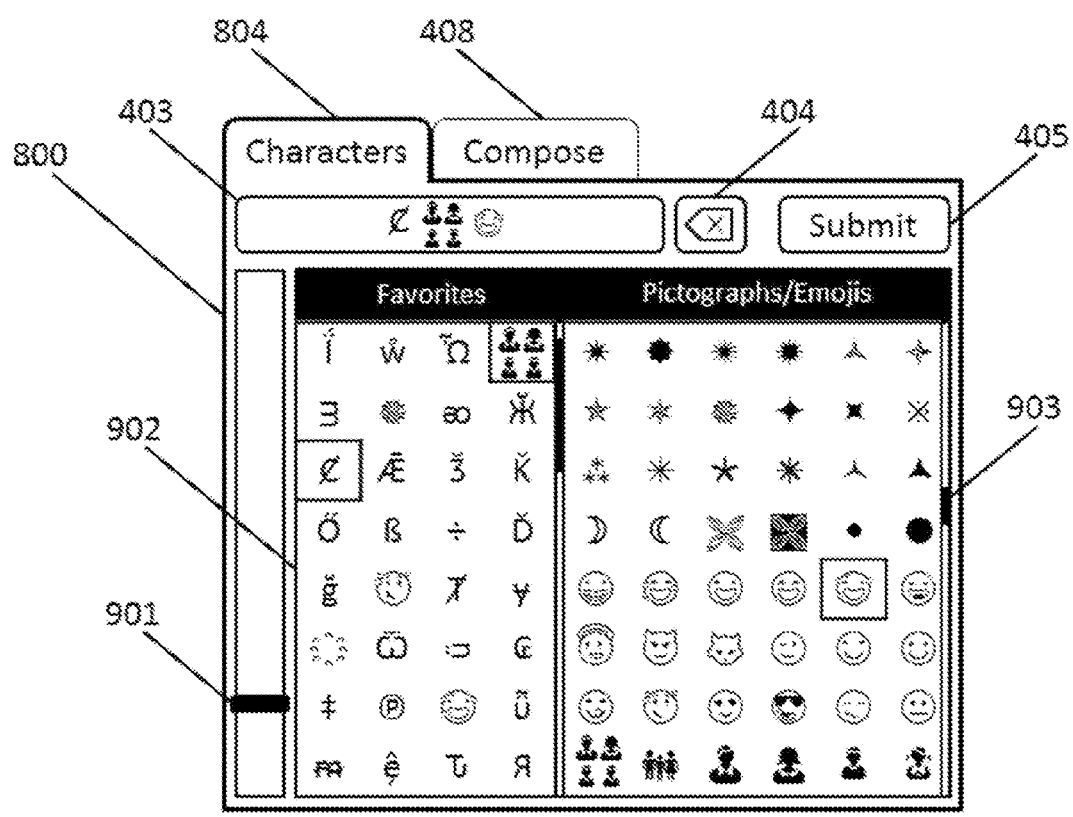
FIG. 9 depicts an exemplary user interface for selecting Unicode characters in accordance with an embodiment of the invention from either a user-defined set of characters or any arbitrary Unicode block, illustrating an exemplary method of selecting pictograph and emoji characters and grapheme clusters for the user's credential.

FIG. 9 illustrates the use of credential input user interface 800 to display pictographs and emojis for potential selection and inclusion in the enhanced credential of the present invention. In this exemplary depiction, user-defined character user interface 902 contains a combination of letters, symbols, pictographs, emojis, and the composed grapheme illustrated in FIG. 7. Character user interface 903 contains pictographs and emojis that the user can select for the enhanced credential. As depicted in FIG. 9, the user has selected two characters from the Favorites user-defined block and one character from the Pictographs/Emojis block, indicated by the highlighted cells in user-defined character user interface 902 and character user interface 903, and accordingly the selected characters are displayed in credential input field 403.

Another advantage of some embodiments of the invention is the ease of creating enhanced credentials incorporating homographs, i.e., characters in different blocks that have the same glyphs. For example, "AB" (U+0041, U+0042) in Latin and "AB" (U+0391, U+0392) in Greek are visually indistinguishable, but are encoded distinctly. Thus, an enhanced credential in accordance with the invention can advantageously use characters from different scripts with the same or nearly the same glyph image, as a safeguard against eavesdroppers and to increase the entropy of the enhanced credential. As another example, the Cyrillic characters M (U+041C) and H (U+041D) are indistinguishable from Latin characters M (U+004D) and H (U+0048). Ideally, an enhanced credential formed in accordance with the invention uses few characters from the Basic Latin block (U+0000-007F), which maps to the ASCII encodings. In one embodiment of the invention, a plurality of uppercase and lowercase homograph characters are displayed in credential input user interface 400 for the user to select in place of characters in the user's native script, e.g., the Latin characters in the Basic Latin block. In another embodiment, credential input user interface 400 indicates which grapheme clusters are optimally used for the enhanced credential based on the effective length of the grapheme cluster, the entropy of the grapheme cluster, or any other reason. For example, in this embodiment credential input user interface 400 can identify the family emoji 301 in FIG. 3 as preferred for use due to its effective length of 22 to 28 bytes visually by providing a green border around the grapheme cluster in the user interface. Alternatively, or additionally, the invention can display characters and grapheme clusters sorted by effective length, from highest to lowest. Moreover, in some embodiments, the invention can provide a visual indication of the calculated strength of the enhanced credential as the user selects characters and grapheme clusters, particularly when the user is setting or changing a credential.

Yet another advantage of some embodiments of the invention is the user's ability to choose not only any arbitrary graphic character, but also to use any of the many spacing marks, some of which produce very subtle spacing between characters and grapheme clusters, each of which are Unicode code points. Of the 25 spacing marks in the Unicode character set, most produce horizontal spacing, and several produce vertical spacing. The horizontal spacing marks are preferably used in the enhanced credentials of the invention. For example, in addition to the common SPACE (U+0020), NO-BREAK SPACE (U+00A0), which is the same as SPACE except that it prevents a line break where used, EN SPACE (U+2002), and EM SPACE (U+2003) are usable in enhanced credentials. Several spacing marks are virtually invisible when used and are thus advantageously used, such as PUNCTUATION SPACE (U+2008), which is the width of a period, THIN SPACE (U+2009), and HAIR SPACE (U+200A). The invention also permits the user to select and include one or more non-spacing marks in the enhanced credential. Such non-spacing marks include ZERO WIDTH SPACE (U+200B), ZERO WIDTH NON JOINER (U+200C), ZERO WIDTH JOINER (U+200D) and WORD JOINER (U+2060). These non-spacing marks are advantageously used in the enhanced credential of the invention because they are not visible, and are thus visually undetectable by an eavesdropper. Although not depicted in FIGS. 4, 5 and 7-9, credential input user interfaces 400 and 800 can graphically display spacing and non-spacing marks for selection in the character user interfaces therein. In one embodiment, the spacing marks are depicted visually by showing the resulting space between adjacent characters such as brackets. The non-spacing marks can be depicted by their abbreviation, e.g., ZWJ, or any other suitable means.

Once the enhanced credential has been entered into credential input field 403, in some embodiments, the user submits the enhanced credential for transformation into an encoded token that is subsequently input to one or more cryptographic operations in the security system of the invention. There are several possible ways that the Unicode characters selected by the user for his or her enhanced credential can be represented within the data buffer associated with credential input field 403. In some cases, the representation of the characters in the enhanced credential depends upon the operating system of the user's device performing the security process. For example, the Microsoft Windows and Apple OS X operating systems natively use Unicode strings encoded with the UTF-16 CEF. Therefore, when the enhanced security method of the invention is practiced on those operating systems, the default Unicode character encoding form will likely be UTF-16. In certain embodiments, the enhanced security system of the invention determines the encoding scheme for the Unicode characters selected by the user for the enhanced credential, which can be UTF-8, UTF-16, UTF-32 or a proprietary scheme. UTF-8 was designed to encode code points from U+0000 to U+007F (ASCII characters) using only one code unit ranging from 0x00 to 7F, but at the expense of not using those values for other code point encodings. Thus, UTF-8 tends to skew the code unit values in a manner that makes its use in the invention use less preferred because Unicode strings encoded with UTF-8 tend to have less entropy than other CEFs. Although UTF-16 is the native CEF in several major operating systems, it not ideal for the transformation stage of the invention to the extent there are surrogate pairs in the enhanced credential, because the system must calculate the value of each code point represented by a surrogate pair. Of the three CEFs defined in Unicode, UTF-32 is preferred for the transformation stage because each code point is directly encoded in a single code unit, regardless of the code point's plane, which requires no decoding or calculation by the system to determine the code point value. In certain embodiments, the proprietary encoding scheme uses code units of 8, 16, 32, 64 or another number of bits, but with a different character encoding form than employed by UTF-8, UTF-16, or UTF-32. It should be appreciated by those skilled in the art that other character encoding forms are usable while remaining within the spirit and scope of the invention.

The primary objective of the present invention is to greatly increase the strength of the encoded tokens formed in accordance with the inventive concepts herein. This objective is met not only by the significant increase in the effective length of encoded tokens compared with conventional credentials, but also by maximizing the entropy of the encoded tokens by ensuring that the value of each byte in the token can be any of the 256 possible values (0x00-FF) or nearly so, such that the probability of any of those values occurring in a given byte is approximately equal. In one embodiment, the method of the invention furthers the objectives described above by potentially lengthening the Unicode string entered by the user by performing Unicode Normalization Form D (NFD) to each user-perceived character in the string, which can be a single code point, grapheme cluster, or combining character sequence. NFD performs a canonical decomposition of each user-perceived character in the Unicode string by expanding it into its decomposed character components, and placing any combining marks into a well-defined order. Thus, if a user selects Å (U+0005, LATIN CAPITAL LETTER A WITH A RING ABOVE or its equivalent, U+212B, ANGSTROM SIGN) as one of the characters in the enhanced credential, NFD will replace the single code point with a combining sequence of two code points: U+0041 (LATIN CAPITAL LETTER A) followed by U+030A (COMBINING RING ABOVE), a combining diacritical mark. There are two benefits to the invention of normalizing with NFD. First, NFD will create canonically-equivalent, well-ordered sequences of code points identically on any platform that is compliant with the Unicode Standard. Second, the code point sequences formed by NFD will be the maximal length canonically-equivalent sequence, furthering one of the central goals of the invention, to create an encoded token with the maximum effective length. In another embodiment, Normalization Form C (NFC), which results in the most composed and therefore compact canonically-equivalent sequence of code points, is used instead of NFD. Other embodiments of the invention use either Normalization Form KC (NFKC) or Normalization Form KD (NFKD). In yet another embodiment of the invention, no normalization is performed on the Unicode string entered by the user.

Following normalization, the normalized Unicode string is encoded using a character encoding scheme (CES). Any of the seven CES schemes defined in Unicode (UTF-8, UTF-16, UTF-16BE, UTF-16LE, UTF-32, UTF-32BE, and UTF-32LE) or a proprietary CES may be used in the invention. For example, in one embodiment a proprietary encoding scheme of some embodiments, called "Uni-24" herein, uses 8-bit code units. In Uni-24, each Unicode code point is encoded using three code units, where the first code unit encodes the plane number (0-16), ranging from 0x01 (plane 0) to FF (plane 16), the second code unit contains the high order byte of the 16-bit value of the code point within the plane, and the third code unit contains the low-order byte of the 16-bit value. Thus, the values in the second and third code units range from 0x00 to FF, furthering one of the objectives of the invention. In this scheme any Unicode code point can be efficiently encoded in 24 bits. A benefit of Uni-24 is that it is unaffected by the endianness of the platform because it is not a multi-byte encoding, and therefore does not require a byte order mark (BOM) when serialized into a byte stream. In another embodiment, a proprietary encoding scheme defined in the invention, called "Uni-32" herein, uses 16-bit code units, but unlike UTF-16, does not encode Unicode code points in the supplementary planes with surrogate pairs. Instead, the Uni-32 embodiment encodes the plane of the Unicode code point (0-16) in the first of two 16-bit code units, ranging from 0x01FE (plane 0) to FFFE (plane 16), and the lower-order 16 bits of the code point in the second 16-bit code unit. Because the lower-order byte in the first code unit is always 0xFE, Uni-32 does not require a byte-order mark to determine the endianness of the encoding scheme, because 0xFE never occurs in the higher-order byte of the first code unit of Uni-32. In this scheme, any Unicode code point is encoded in 32 bits, which increases the effective length of the encoded token, without the zero-value high-order bytes prevalent in UTF-32, UTF-32BE, and UTF-32LE encodings that decrease the entropy of the token. Table 1000 in FIG. 10 illustrates how code points in each of the seventeen Unicode planes are encoded using the Uni-24 and Uni-32 character encoding schemes, with one row of table 1000 for each plane. Column 1001 in table 1000 contains the Unicode plane number for the 17 planes defined in Unicode, which ranges from 0 (BMP) to 16 (decimal). Column 1002 represents the code points in each of the seventeen planes, where the first two numbers, e.g., 00 and 0C, are the plane number (in hexadecimal). The remainder of the code points listed in column 1002, "wxyz" represent the lower order 16 bits of each code point, where each letter, e.g., "w," is a 4-bit nibble. Columns 1003, 1004 and 1005 of table 1000 illustrate how the first, second and third code units in Uni-24 map to code points in each of the seventeen planes. For example, code points in plane 0 (the BMP) are encoded with 0x01 in the first code unit, the high order byte of the 16-bit value of the code point within the plane in the second code unit (represented by nibbles "wx"), and the third code unit contains the low-order byte of the 16-bit value (represented by nibbles "yz"). Columns 1006 and 1007 of table 1000 illustrate how the first and second code units in Uni-32 map to code points in each of the seventeen planes. For example, code points in plane 0 (the BMP) are encoded with 0x01FE in the first code unit, and the 16-bit value of the code point within the plane in the second code unit (represented by nibbles "wxyz").

FIG. 11 illustrates in table 1100 how an enhanced credential is transformed, in some embodiments, into an encoded token. Enhanced credential 1101, depicted in row 1102, is comprised of three user-perceived characters, or graphemes, and therefore has an apparent length of 3. The graphemes in enhanced credential 1101 include a character encoded as a single code point, a composed grapheme cluster formed in accordance with the invention (see FIG. 6), and an emoji grapheme cluster (see FIG. 3). In the example of FIG. 11, the enhanced credential is encoded as a Unicode string in the UTF-16 CEF, comprised of fifteen 16-bit code units, for a total effective length of 30 bytes. The Unicode string in row 1103 is normalized using Unicode NFD normalization, resulting in the UTF-16 CEF-encoded normalized string depicted in row 1104 of table 1100. In this example, the encoding of two of the three characters in the enhanced credential has changed as a result of normalization. The first character, encoded as a single code point in the Unicode string representing the entered enhanced credential, has been normalized into its canonically equivalent decomposed form, which expands the encoding into two code points. The second character, the composed grapheme cluster, has the same number of code points after normalization, but the order of the two combining marks has been reversed to place them in the well-defined order specified in the Unicode standard. The encoding for the third grapheme cluster, the emoji, is unaltered by the normalization because it was already maximally decomposed. The net effect of normalization is an addition of two bytes, yielding an effective length of 32 bytes. Row 1105 depicts how the normalized Unicode string in UTF-16 CEF is encoded in the Uni-32 character encoding scheme of the invention (see FIG. 10), in the exemplary embodiment of FIG. 11. Uni-32 encodes each code point with a 32-bit code unit, which further expands the effective length by 16 bytes, resulting in an effective length of 48 bytes. The encoded token resulting from the transformation illustrated in FIG. 11 is shown in serialized form in row 1106. The ratio of effective to apparent length, referenced herein as the expansion ratio, is 16 (48:3), and is a useful metric for the efficacy of the inventive methods herein. The exemplary 48-byte encoded token of FIG. 11 theoretically has $256^{48}$ permutations, but because the first code unit of each code point can only be one of seventeen values and the lower order byte of the first code unit is always 0xFE in accordance with the Uni-32 scheme, there are $(17^{12}) \cdot (256^{24})$, or $3.65 \times 10^{72}$ permutations. It is therefore computationally infeasible to break enhanced credential 1101 using known brute force attacks.

Those skilled in the art should appreciate that if the exemplary enhanced credential 1101 in FIG. 11 is instead encoded with the Uni-24 character encoding scheme, the effective length of the encoded token is 36 bytes, yielding an expansion ratio of 12 (36:3). By design, the number of permutations in this Uni-24 example remains $3.65 \times 10^{72}$. In alternative embodiments, more than one CES can be used within the same encoded token, provided well-defined rules are applied, e.g., by adopting different character encoding schemes for different planes. It should be appreciated by those of skill in the art that other character encoding schemes are usable while remaining within the spirit and scope of the invention.

Figure 12:
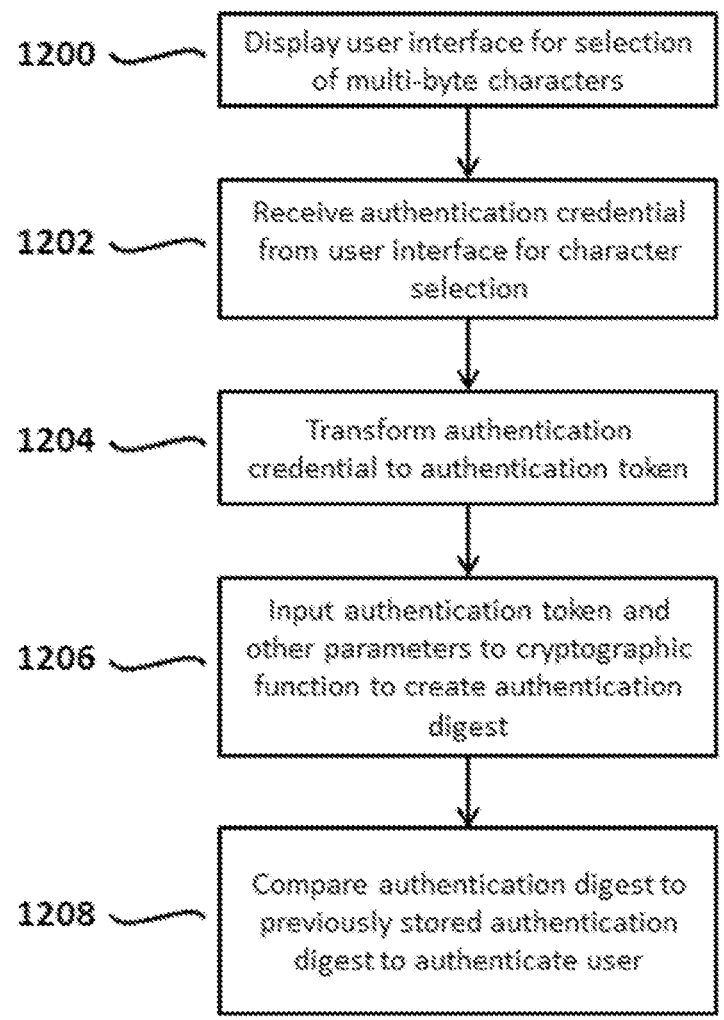
FIG. 12 is a flow chart illustrating a process for enhanced authentication of a user.

FIG. 12 is a flow chart of a process to authenticate a user. In step 1200, the authentication system of the invention displays a user interface for selecting multi-byte characters, such as Unicode characters, like credential input user interface 400 or 800. In step 1202, the authentication system receives the authentication credential from the user interface displayed in step 1200 once the user finishes entering the credential. In step 1204, the authentication system transforms the received authentication credential into an authentication token, as described with regard to FIG. 11, where the authentication token is an encoded token formed in accordance with the invention. In step 1206, the authentication token is provided as one of the inputs to a cryptographic function, such as a hash function, keyed hash function, message digest function, or key derivation function, each of which produces a cryptographically processed output from one or more inputs. In the parlance of cryptographic functions, the authentication token formed by the invention would be considered a message and input to one or more cryptographic functions. The output of the one or more cryptographic functions is an authentication digest, which is a cryptographically random binary sequence that always results when the same authentication token is input to the cryptographic function. In step 1208, the authentication digest output from the one or more cryptographic functions is compared to the previously stored authentication digest that was generated by the same cryptographic function when the user set or updated his or her credential in the authentication system. If the authentication digest generated in step 1206 matches the previously stored authentication digest exactly, the authentication system has authenticated the user.

Figure 13:
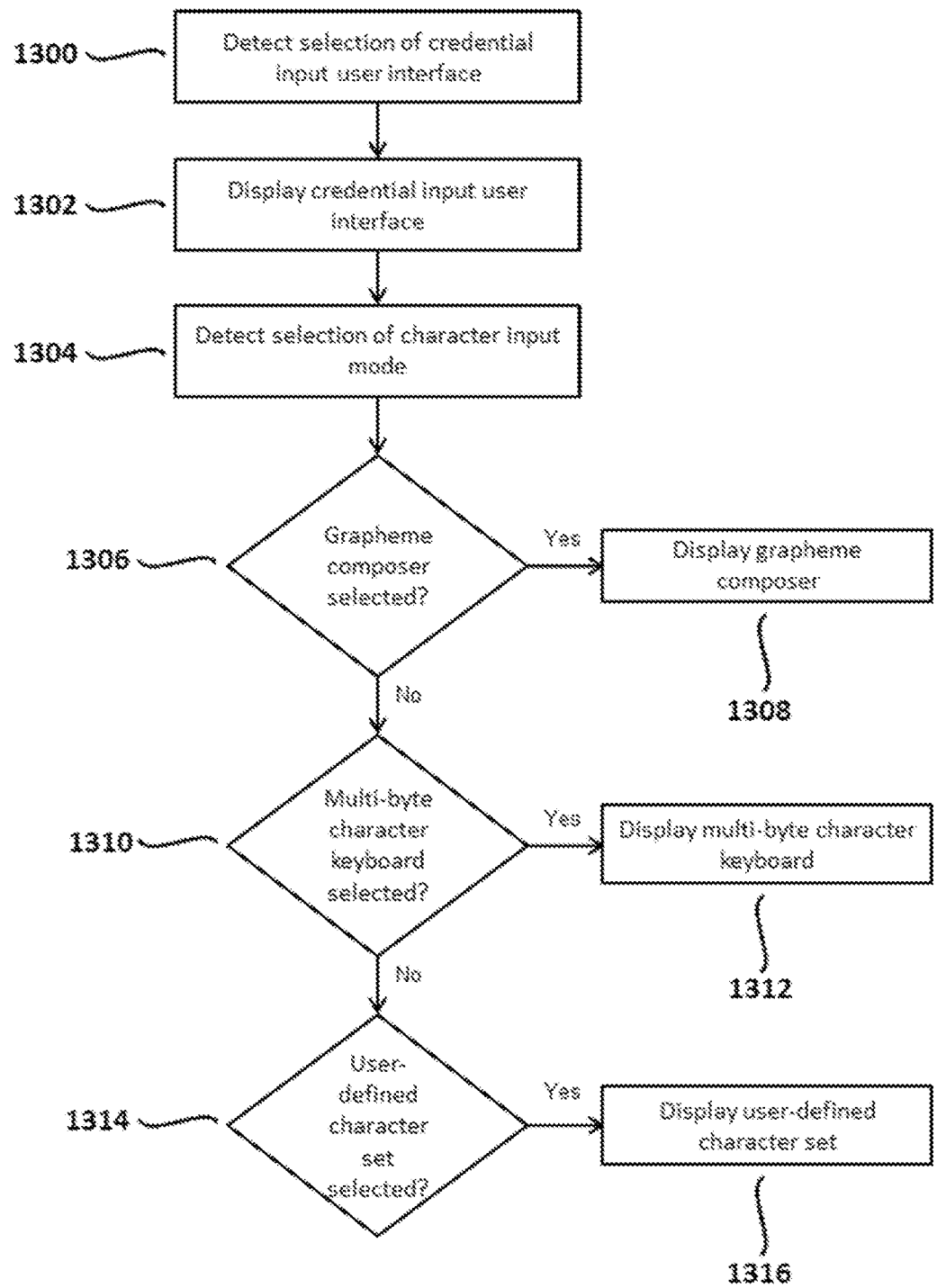
FIG. 13 is a flow chart illustrating a process for providing user interfaces for the selection of multi-byte characters and grapheme clusters by a user.

FIG. 13 is a flow chart of a process that implements step 1200 in FIG. 12. In step 1300, the security system detects the credential input user interface has been selected either manually by the user or automatically by the security system or the operating system. The security system displays the credential input user interface, e.g. user interface 400 in FIG. 4 or user interface 800 in FIG. 8. In step 1304, the security system detects the selection of the character input mode within the credential input user interface. In step 1306, if (i.e., if and only if) the user selected the grapheme compose mode of the credential input user interface, in step 1308 the grapheme composer is displayed in the user interface, e.g., as depicted in FIG. 7. If the grapheme composer was not selected in step 1306, the security system detects whether the multi-byte character keyboard or user interface was selected in step 1310. If the multi-byte character user interface was selected in step 1310, in step 1312 the multi-byte character keyboard or user interface is displayed in the user interface, e.g., as depicted in FIG. 4. If the multi-byte character keyboard or user interface was not selected in step 1310, the security system detects whether the user-defined character set user interface was selected in step 1314. If the user-defined character set user interface was selected in step 1314, in step 1316 the user-defined character set user interface is displayed in the user interface, e.g., as depicted in FIG. 5. If no input mode has been selected by the user, the security system waits to detect a selection by the user of the input mode, which can be accomplished by hardware or software interrupts, timers, semaphores, and other means as known by those skilled in the art. In certain embodiments of the invention in which the multi-byte character user interface is combined with the user-defined character set user interface, e.g., as depicted in FIGS. 8 and 9, there is not a separate detection for selection of the user-defined character set input mode, obviating steps 1314 and 1316 in FIG. 13.

Figure 14:
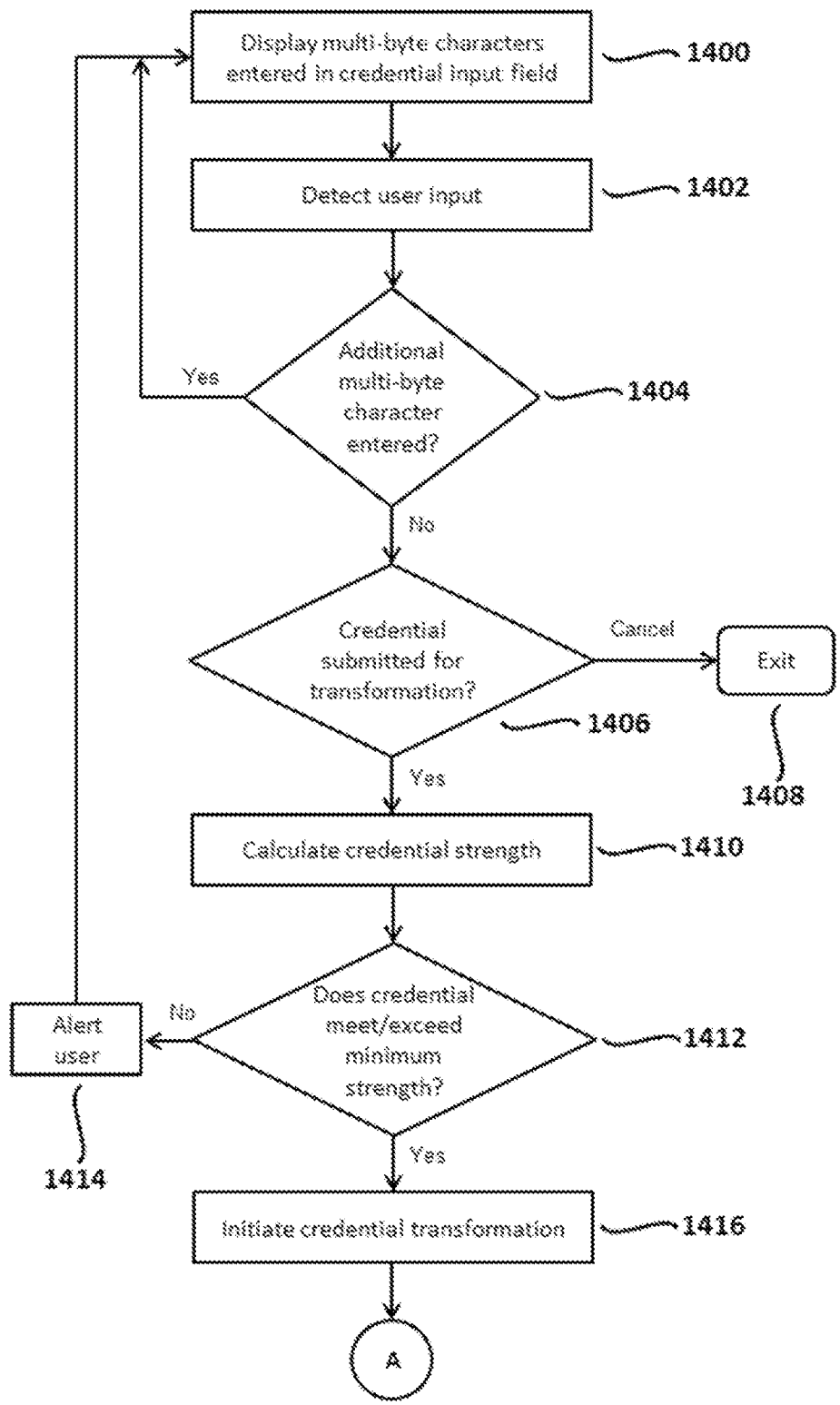
FIG. 14 is a flow chart illustrating a process for receiving the multi-byte characters selected by the user and forming an enhanced credential.

FIG. 14 is a flow chart of a process that implements step 1202 in FIG. 12. In step 1400, the security system displays the multi-byte characters, which can include Unicode characters including graphic characters, spacing marks, non-spacing marks, composed grapheme clusters, and selected grapheme clusters, that have been entered by the user into credential input field 403, e.g., in FIG. 4. In step 1402, credential input user interface 400 or 800 detects user input, which can include selecting another character, moving or deleting a character within the credential input field, or selecting another control within the credential input user interface. In step 1404, the credential input user interface detects whether the user has entered an additional multi-byte character into the credential input field, and if so, control flow returns to step 1400. If the user did not enter an additional multi-byte character in the credential input field, the security system in step 1406 determines whether the credential entered by the user has been submitted for transformation into an encoded token in accordance with the invention. If the user canceled the entry of the credential in the credential input user interface, the credential input flow of the security system exits in step 1408. If the user submitted the credential for transformation, in step 1410 the security system calculates the credential strength. It is conventional in the art to calculate the approximate entropy of a password, measured in bits of information by counting the number of lowercase letters, uppercase letters, numbers, and symbols, such as punctuation characters, then adjusting to account for sequences of characters that either increase or decrease the entropy. Such conventional techniques are inadequate to calculate the strength of enhanced credentials formed in accordance with the present invention, because they do not account for the advantageous use of multi-byte characters, and in particular, Unicode characters and grapheme clusters, in the invention. Accordingly, in one embodiment calculating the credential strength entails taking into account one or more of the number of (1) user-perceived characters; (2) code points; and (3) grapheme clusters in the credential, the expansion ratio, the effective length of the credential in bytes, and possibly any of the aforementioned conventional password strength metrics. In another embodiment, the number of different blocks or sets of multi-byte characters from which the characters in the credential are drawn from is considered in addition to the previously listed metrics. Because enhanced credentials of the invention are far stronger than conventional passwords, even a relatively short enhanced credential such as the one depicted in FIG. 11 is more than adequate for virtually any purpose. Credential 1101 has an apparent length of 3, an effective length of 30 bytes (before transformation to an encoded token), yielding a pre-transformation expansion ratio of 10. The enhanced credential in FIG. 11 has several desirable traits: it contains a composed grapheme cluster (the middle user-perceived character in credential 1101) and an emoji grapheme cluster. Each of these characters contributes to the overall strength of the enhanced credential by increasing the length, especially the emoji character, and by contributing a sequence with very high entropy, especially the composed grapheme cluster. Enhanced credential 1101 is an example of a strong core credential that can be easily modified for all of the user's accounts and sites by either adding a prefix or suffix to the enhanced credential with the name of the resource to which it pertains. For example, the word "bank" can be added to enhanced credential 1101 without detracting from the strength whatsoever. This is but one way that enhanced credentials of the invention can be formed to accomplish the formerly mutually exclusive goals of credentials that are both easy to remember and sufficient strong to avoid compromise. In step 1412, the security system determines whether the calculated credential strength meets or exceeds the minimum strength required by the security system, which can be tailored to the security application and/or account. For example, the security system may require a stronger enhanced credential for financial accounts, and permit a lesser measure of strength for enhanced credentials used for loyalty accounts. If the calculated credential strength does not meet or exceed the minimum strength, the user is alerted in step 1414. Ideally, the user is informed in step 1414 not only that the credential does not meet the minimum strength requirement, but also how it is deficient so that the user can address the deficiency. Control flow then resumes with step 1400. If the credential does meet or exceed the minimum strength requirement, the security system in step 1416 initiates the transformation of the enhanced credential into an encoded token.

Figure 15:
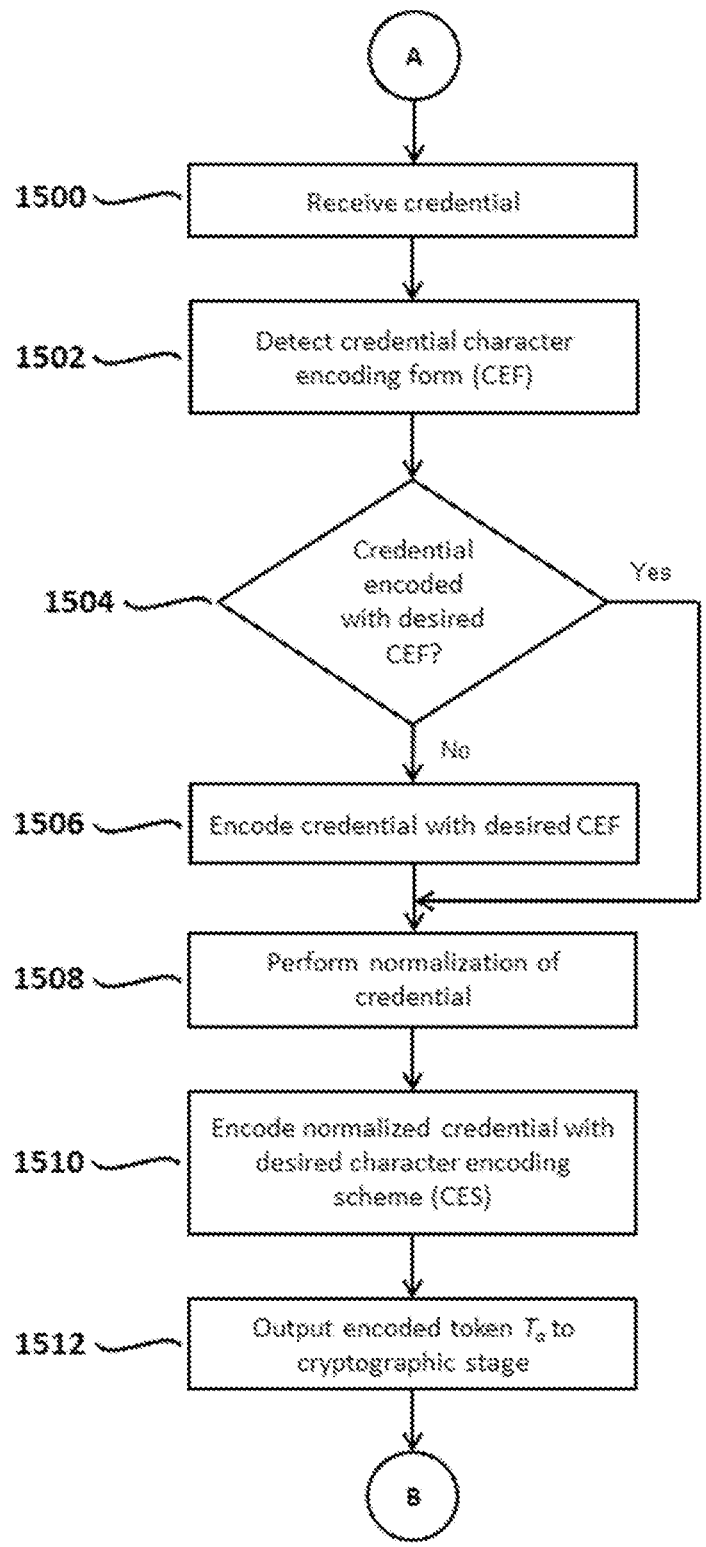
FIG. 15 is a flow chart illustrating a process for transforming the user's enhanced credential into an encoded token.

FIG. 15 is a flow chart of a process that implements step 1204 in FIG. 12. In step 1500, the enhanced credential is received from the input stage, e.g., FIG. 14. In step 1502, the character encoding form (CEF) of the received credential is detected. Based on the security system and/or the operating system or platform on which the security system is executing, the detected CEF may be one of the three CEFs supported in Unicode, namely UTF-8, UTF-16, or UTF-32, or it may be another, proprietary character encoding form. As discussed previously, each of the three Unicode CEFs has advantages and disadvantages for use in the transformation stage. If the detected CEF is not the desired CEF for the transformation stage, control flow transfers to step 1506. Otherwise, control flow transfers to step 1508. In step 1506, the credential is encoded with the desired CEF. In step 1508, the encoded credential is normalized to increase the effective length and entropy of the credential. For example, for a Unicode credential, performing Normalization Form D (NFD) on the encoded credential is the optimal normalization because it creates the maximal length decomposed credential, and places combining marks in a well-defined order, which enhances the interoperability of the invention on different platforms. In other embodiments, the invention performs one of Unicode normalizations NFC, NFKD, or NFKC, or another type of normalization not defined in the Unicode standard that furthers the objectives of the invention. In yet another embodiment, particularly for very long credentials, normalization of the encoded credential is not performed. In step 1510, the normalized credential is encoded with the desired character encoding scheme, such as one of the seven CESs supported in Unicode, or CESs Uni-24 or Uni-32 defined herein, or another, proprietary CES that furthers the objectives of the invention. The result of step 1510 is an encoded token $T_a$. In step 1512, encoded token $T_a$ is output to the cryptographic stage.

Figure 16:
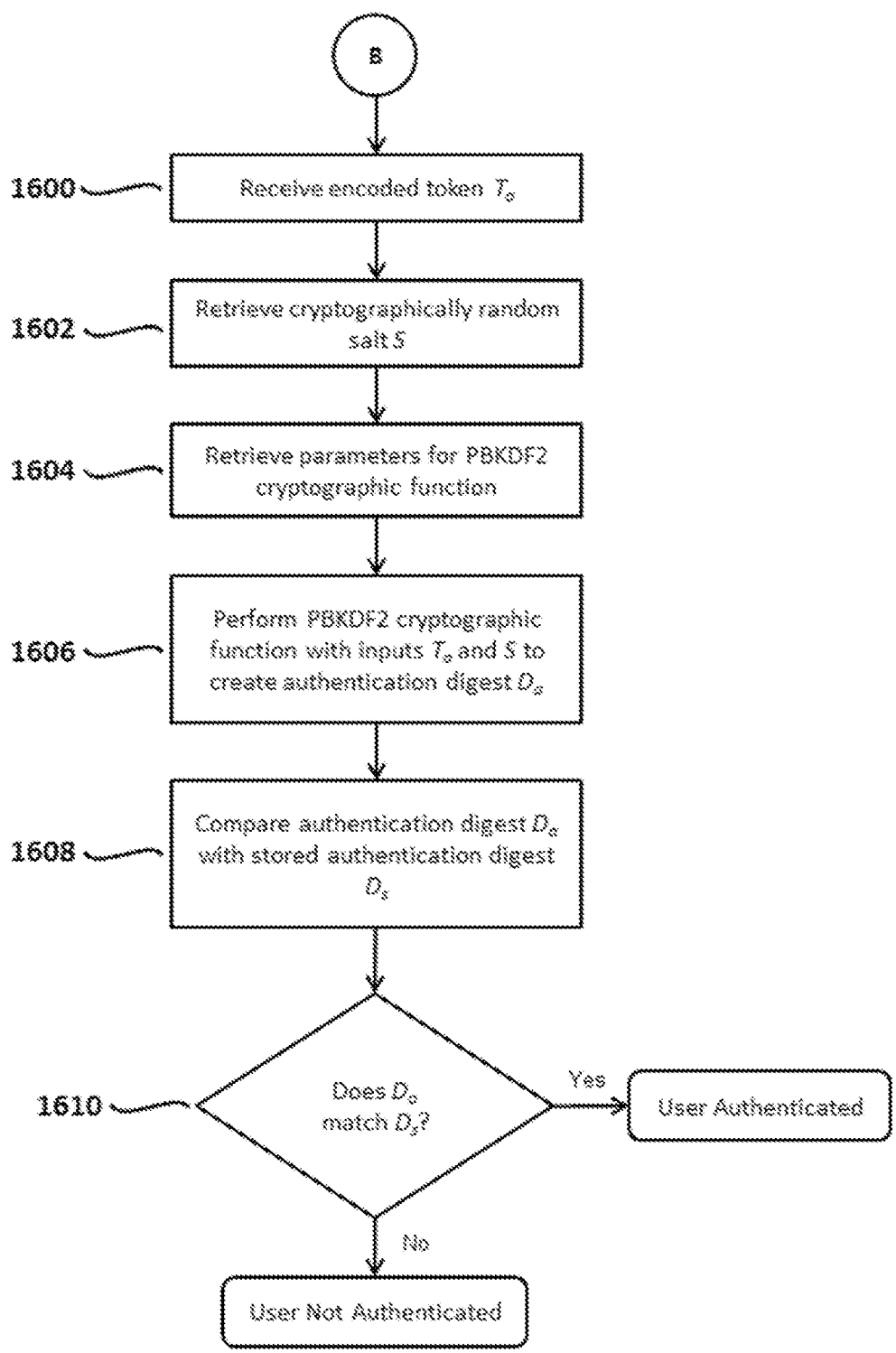
FIG. 16 is a flow chart illustrating a process in which an authentication digest is generated from the encoded token for use in authenticating a user.

FIG. 16 is a flow chart of a process that implements steps 1206 and 1208 in FIG. 12. In step 1600, encoded token $T_a$ is received from the transformation stage. In step 1602, a cryptographically random salt S is retrieved for use in one or more cryptographic operations on the encoded token. In some embodiments, salt S is stored locally to the device on which the security system is executing, and in other embodiments salt S is stored on another device and provided to the device on which the security system is executing via a network or attached I/O device. For example, in one embodiment, the security system of the present invention is in communication with a server providing salt S to the security system, either from storage memory of the server or generated on the server as a cryptographic nonce. In some embodiments, salt S is different each time the user inputs their enhanced credential to the security system, and in other embodiments, salt S is fixed for some indefinite amount of time. The invention is not limited to the use of one cryptographically random salt S, but may use cryptographically random salts $S_1, S_2, \ldots S_n$. In step 1604, the security system retrieves the remaining parameters for the exemplary embodiment of FIG. 16 in which the cryptographic operation is the PBKDF2 key derivation function. The other parameters for PBKDF2 are the pseudo-random function (PRF), number of iterations c, and length of derived key l. These parameters may be provided from configuration storage within the security system, or provided from another device or computer such as a server in network communication with the device on which the security system is executing. In step 1606, the security system performs cryptographic operation PBKDF2 upon the encoded token as the password input, salt S, number of iterations c, and desired key length l, using the specified PRF. In this embodiment, the output of the PBKDF2 cryptographic operation is authentication digest $D_a$. In step 1610, authentication digest $D_a$ is compared with stored authentication digest $D_s$, which can be stored locally on the device on which the security system is executing, or another device or computer such as a server in network communication with the device on which the security system is executing. If the comparison in step 1610 indicates that authentication digest $D_a$ matches stored authentication digest $D_s$, the user is authenticated, which security system will indicate to the process or thread that invoked the authentication process. Otherwise, the user is not authenticated, which security system will also indicate in the same fashion. Those skilled in the art will appreciate that the cryptographic operation in this illustrative embodiment is exemplary only, and that the invention is suitable for many other cryptographic operations such as cryptographic hash functions and other key derivation functions such as bcrypt, as well as other cryptographic operations used in diverse applications such as quantum cryptography.

Figure 17:
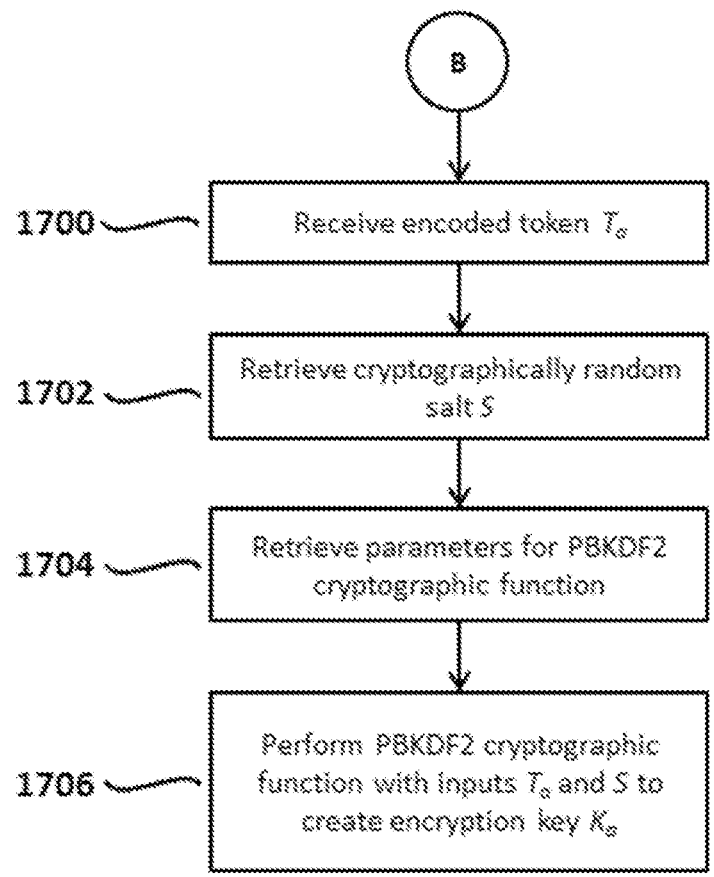
FIG. 17 is a flow chart illustrating a process in which an encryption key is generated from the encoded token for use in symmetric key encryption.

FIG. 17 is a flow chart of a process to derive an encryption key. In step 1700, encoded token $T_a$ is received from the transformation stage. In step 1702, a cryptographically random salt S is retrieved for use in one or more cryptographic operations on the encoded token. In some embodiments, salt S is stored locally to the device on which the security system is executing, and in other embodiments salt S is stored on another device and provided to the device on which the security system is executing via a network or attached I/O device. For example, in one embodiment, the security system of the present invention is in communication with a server providing salt S to the security system, either from storage memory of the server or generated on the server as a cryptographic nonce. In some embodiments, salt S is different each time the user inputs their enhanced credential to the security system, and in other embodiments, salt S is fixed for some indefinite amount of time. The invention is not limited to the use of one cryptographically random salt S, but may use cryptographically random salts $S_1, S_2, \ldots S_n$. In step 1704, the security system retrieves the remaining parameters for the exemplary embodiment of FIG. 17 in which the cryptographic operation is the PBKDF2 key derivation function. The other parameters for PBKDF2 are the pseudo-random function (PRF), number of iterations c, and length of derived key l. These parameters may be provided from configuration storage within the security system, or provided from another device or computer such as a server in network communication with the device on which the security system is executing. In step 1706, the security system performs cryptographic operation PBKDF2 upon the encoded token as the password input, salt S, number of iterations c, and desired key length l, using the specified PRF. In this embodiment, the output of the PBKDF2 cryptographic operation is encryption key $K_a$. Those skilled in the art will appreciate that encryption key $K_a$ is directly usable for symmetric key encryption, or can be used as an intermediate encryption or decryption key for other cryptographic purposes.

The computing steps divided above may be performed by a single computing device, or may be distributed among multiple such devices in some embodiments. For instance, steps 1200-1204 of FIG. 12 and the processes of FIGS. 13-15 may be performed by a client computing device, and steps 1206 and 1208 of FIG. 12 and processes of FIGS. 16-17 may be executed by a remote computing device, like a remote server that receives the authentication token via the Internet. In another example, each of the processes described with reference to FIGS. 12-17 may be performed by a single computing device, such as in the course of unlocking a lock screen of a user's computing device, or logging into a user's computing device.

Figure 18:
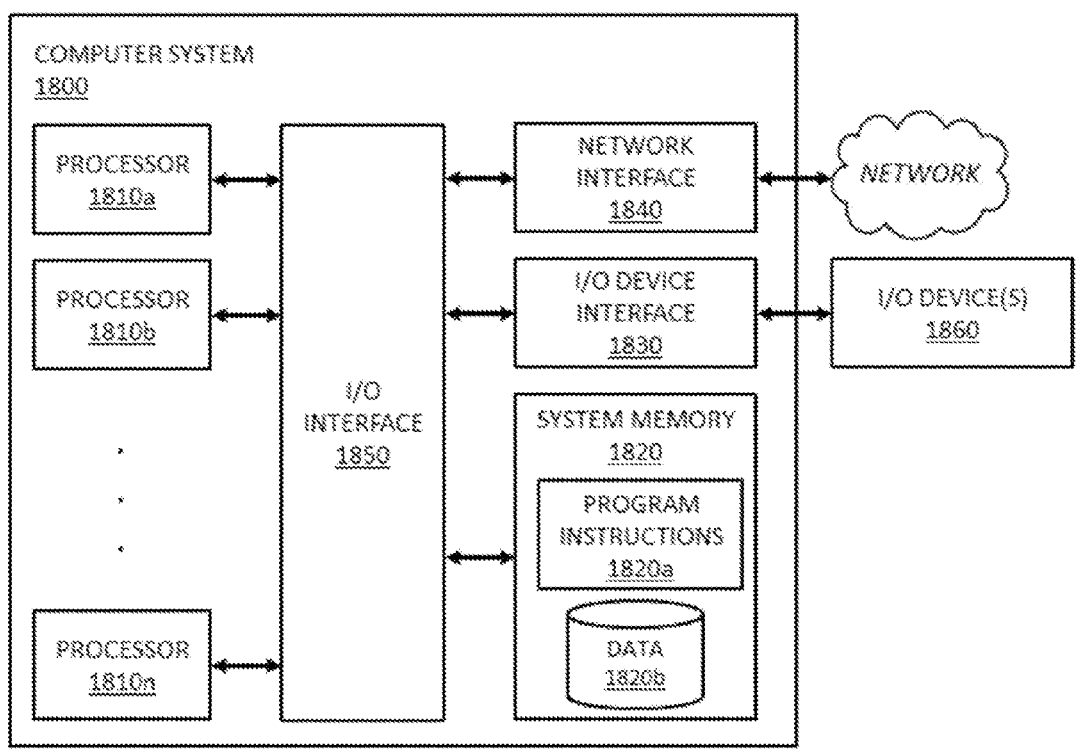
FIG. 18 depicts an exemplary computer system by which some embodiments are implemented.

FIG. 18 is a diagram that illustrates an exemplary computing system 1800 in accordance with embodiments of the present techniques. Various portions of systems and methods described herein, may include or be executed on one or more computer systems similar to computing system 1800. Further, processes and modules described herein may be executed by one or more processing systems similar to that of computing system 1800.

Computing system 1800 may include one or more processors (e.g., processors 1810a-1810n) coupled to system memory 1820, an input/output I/O device interface 1830, and a network interface 1840 via an input/output (I/O) interface 1850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1820). Computing system 1800 may be a uni-processor system including one processor (e.g., processor 1810a), or a multi-processor system including any number of suitable processors (e.g., 1810a-1810n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1800 may include a plurality of computing devices (e.g., distributed computer systems) to implement various processing functions.

I/O device interface 1830 may provide an interface for connection of one or more I/O devices 1860 to computer system 1800. I/O devices may include devices that receive input (e.g., from a user) or output information (e.g., to a user). I/O devices 1860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1860 may be connected to computer system 1800 through a wired or wireless connection. I/O devices 1860 may be connected to computer system 1800 from a remote location. I/O devices 1860 located on remote computer system, for example, may be connected to computer system 1800 via a network and network interface 1840.

Network interface 1840 may include a network adapter that provides for connection of computer system 1800 to a network. Network interface 1840 may facilitate data exchange between computer system 1800 and other devices connected to the network. Network interface 1840 may support wired and/or wireless communication. The network may include an electronic communication network, such as the Internet, a local area network (LAN), a personal area network (PAN), a near field communication network (NFC), a wide area network (WAN), a cellular communications network, or the like.

System memory 1820 may be configured to store program instructions 1820a or data 1820b. Program instructions 1820a may be executable by a processor (e.g., one or more of processors 1810a-1810n) to implement one or more embodiments of the present techniques. Instructions 1820a may include modules of computer program instructions for implementing one or more techniques described herein with regard to various processing modules. Program instructions may include a computer program (which in certain forms is known as a program, application, software, software application, applet, plug-in, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1820 may include a non-transitory computer readable storage medium that may have program instructions stored thereon that are executable by a computer processor (e.g., one or more of processors 1810a-1810n) to cause the subject matter and the functional operations described herein. A memory (e.g., system memory 1820) may include a single memory device and/or a plurality of memory devices (e.g., distributed memory devices).

I/O interface 1850 may be configured to coordinate I/O traffic between processors 1810a-1810n, system memory 1820, network interface 1840, I/O devices 1860, and/or other peripheral devices. I/O interface 1850 may perform protocol, timing, or other data transformations to convert data signals from one component (e.g., system memory 1820) into a format suitable for use by another component (e.g., processors 1810a-1810n). I/O interface 1850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1800 or multiple computer systems 1800 configured to host different portions or instances of embodiments. Multiple computer systems 1800 may provide for parallel or sequential processing/execution of one or more portions of the techniques described herein.

Those skilled in the art will appreciate that computer system 1800 is merely illustrative and is not intended to limit the scope of the techniques described herein. Computer system 1800 may include any combination of devices or software that may perform or otherwise provide for the performance of the techniques described herein. For example, computer system 1800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Figure 19:
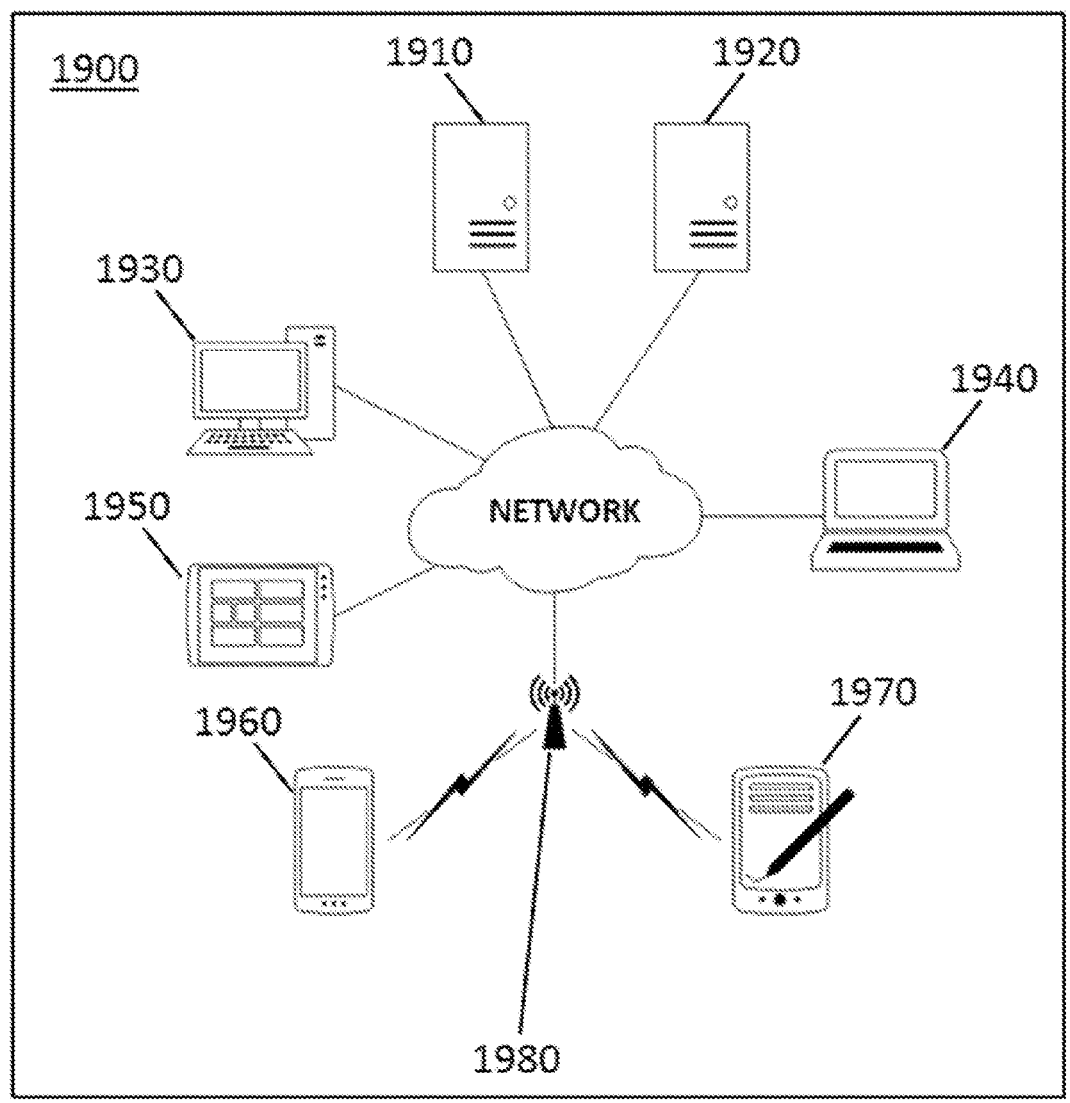
FIG. 19 depicts a network diagram with exemplary computing systems by which some embodiments are implemented.

FIG. 19 is a network diagram that illustrates exemplary computing systems in communication with one or more computing systems in network 1900 to implement enhanced security systems in accordance with embodiments of the present technique. Various portions of the systems and methods described herein may include implementation on one or more computing systems depicted in network 1900. For example, it is contemplated that the invention can be implemented completely on any exemplary device depicted in FIG. 19, including server computers 1910 and 1920, desktop computer 1930, notebook computer 1940, tablet 1950, smartphone 1960, or personal digital assistant (PDA) 1970. However, the invention may also be advantageously implemented on two or more of the exemplary devices depicted in FIG. 19. Although the network 1900 is depicted without detail of specific network implementations save for wireless access point 1980, those skilled in the art should understand that the invention is not limited by any particular network configuration, and indeed the invention is flexible enough to be implemented in the context of any network type or configuration, including local area networks (LAN), wide area networks (WAN), personal area networks (PAN), and wireless networks of various types including LANs, WANs, and PANs. For example, in a client-server embodiment, any of client devices comprising desktop computer 1930, notebook computer 1940, tablet 1950, smartphone 1960, or personal digital assistant (PDA) 1970 can implement any part of the invention described herein, with the remainder of the invention implemented on either or both server computers 1910 and 1920. In one embodiment, server computers 1910 and/or 1920 store one or more cryptographic salts retrieved by a client system hosting part of the security system of the invention. Additionally, in some embodiments, one or more server computers 1910 and 1920 store one or more authentication digests $D_s$, for comparison to a generated authentication digest on one or more client devices in network 1900. Those skilled in the art will appreciate the myriad configurations and scenarios of both devices and networks possible with the invention, all of which are intended to be within the spirit and scope of the invention.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicant has grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method, comprising: obtaining, with a computing device, a multi-byte character set specifying a plurality of characters; receiving, with the computing device, a knowledge factor credential encoded with a plurality of characters of the multi-byte character set, wherein the knowledge factor credential has a longer effective length than an apparent length, and wherein the knowledge factor credential has at least one character outside of a block of characters designated for a locale of the computing device; and providing, with the computing device, the knowledge factor credential to authenticate a user.

2. The method of embodiment 1, wherein: the multi-byte character set specifying a plurality of characters is a Unicode character set specifying more than 32,000 characters; receiving a knowledge factor credential comprises: displaying a user interface by which a user is presented more than 32,000 user-selectable characters of the Unicode character set; and receiving at least one character of the knowledge factor credential via the user interface, wherein at least one character of the knowledge factor credential combines a plurality of constituent characters into a single character with code points; providing the knowledge factor credential comprises: transforming the knowledge factor credential into an authentication token; and creating an authentication digest based on the authentication token and at least one other parameter; the method further comprises: comparing the authentication digest to a previously stored authentication digest to authenticate the user.

3. The method of any of embodiments 1-2, wherein receiving the knowledge factor credential comprises: presenting a user interface through which more than 256 characters are selectable; and receiving a user selection of at least one of the more than 256 characters.

4. The method of embodiment 3, wherein presenting a user interface through which more than 256 characters are selectable comprises: presenting a user interface through which more than 1,024 characters are selectable.

5. The method of embodiment 3, wherein presenting a user interface through which more than 256 characters are selectable comprises: presenting a user interface through which more than 4,096 characters are selectable.

6. The method of embodiment 3, wherein presenting a user interface through which more than 256 characters are selectable comprises: presenting a user interface through which more than 32,768 characters are selectable.

7. The method of any of embodiments 1-6, wherein receiving the knowledge factor credential comprises: presenting a user interface by which a single composite character is composed by selecting a plurality of constituent characters; receiving user selections of the constituent characters; and combining the constituent characters into a single character with a plurality of code points, wherein the single character is at least one composite character of the knowledge factor credential.

8. The method of any of embodiments 1-7, wherein receiving the knowledge factor credential comprises: retrieving from memory candidate characters based on a user previously designating the candidate characters; presenting a user interface by which the candidate characters are selectable; and receiving a user selection of at least one of the candidate characters.

9. The method of embodiment 8, wherein presenting a user interface by which the candidate characters are selectable comprises: interspersing the candidate characters among un-designated characters to obfuscate which characters were previously designated.

10. The method of any of embodiments 1-9, wherein providing the knowledge factor credential to authenticate a user comprises: normalizing the characters of the credential by changing a sequence of bits with which at least one of the characters in the credential is encoded.

11. The method of any of embodiments 1-10, wherein providing the knowledge factor credential to authenticate a user comprises: including a byte order mark to a sequence of bytes encoding the knowledge factor credential; and sequencing the bytes encoding knowledge factor credential consistent with the byte order mark.

12. The method of any of embodiments 1-11, wherein providing the knowledge factor credential to authenticate a user comprises: submitting the knowledge factor credential via an un-lock screen or a login screen of an operating system executed by the computing device.

13. The method of any of embodiments 1-12, wherein the multi-byte character set comprises more than 100,000 characters.

14. The method of any of embodiments 1-13, wherein the multi-byte character set comprises a Unicode character set.

15. The method of any of embodiments 1-14, wherein the knowledge factor credential comprises at least one emoji character.

16. The method of any of embodiments 1-15, wherein the knowledge factor credential comprises a user-composed character comprising multiple, user-selected constituent characters in a single apparent character.

17. A system, comprising: one or more processors; and memory storing instructions that when executed by at least some of the processors effectuate operations comprising: the steps of any of embodiments 1-16.

18. A tangible, machine-readable, non-transitory medium storing instructions that when executed by a data processing apparatus effectuate operations comprising: the steps of any of embodiments 1-16.

What is claimed is:

1. A method, comprising:
obtaining, with a computing device, a multi-byte character set specifying a plurality of characters;
receiving, with the computing device, a knowledge factor credential encoded with a plurality of characters of the multi-byte character set, wherein the knowledge factor credential has a longer effective length than an apparent length, wherein receiving the knowledge factor credential comprises:
presenting a user interface by which a single composite character is composed by selecting a plurality of constituent characters;
receiving user selections of the constituent characters, wherein receiving the user selections of constituent characters comprises:
presenting an interface by which the user selects a base character;
receiving a selection of the base character;
in response to receiving the selection of the base character, presenting an interface, or enabling a previously presented interface, by which the user selects a combining mark to be combined with the base character in the single composite character;
receiving a user selection of a combining mark;
determining that the user has not selected more than a threshold amount of combining marks to be combined with the base character; and
in response to the determination, accepting an additional combining mark to be combined with the base character in the single composite character; and
combining the constituent characters into a single composite character with a plurality of code points, wherein the single composite character is at least one composite character of the knowledge factor credential; and
providing, with the computing device, the knowledge factor credential to authenticate a user.

2. The method of claim 1, wherein:
a resulting glyph image of the single composite character is not used in any Unicode-recognized writing system;
the single composite character comprises a base character and more than two combining marks;
the multi-byte character set specifying a plurality of characters is a Unicode character set specifying more than 256 characters;
the knowledge factor credential has at least one character outside of a block of characters designated for a locale of the computing device;
providing the knowledge factor credential comprises:
encoding a normalized version of the single composite character with Unicode Transformation Format (UTF)-8, UTF-16, or UTF-32;
transforming an encoded version of the knowledge factor credential into an authentication token; and
creating an authentication digest based on the authentication token and at least one other parameter.

3. The method of claim 1, further comprising: providing an operating system of the computing device to which the user is granted access upon authenticating the user.

4. The method of claim 3, further comprising: providing the computing device.

5. The method of claim 1, wherein:
a glyph image of the single composite character is not used in any Unicode-recognized writing system.

6. The method of claim 1, wherein:
providing the knowledge factor credential comprises normalizing the single composite character with Unicode Normalization Form D.

7. The method of claim 1, wherein providing the knowledge factor credential comprises encoding a normalized version of the single composite character with Uni-24 or Uni-32.

8. The method of claim 1, wherein presenting the user interface comprises performing steps for displaying a user interface for selecting multi-byte characters.

9. The method of claim 1, wherein receiving user selection of the constituent characters comprises performing steps for receiving authentication credentials from the user interface.

10. The method of claim 1, wherein providing the knowledge factor credential comprises performing steps for transforming the authentication credential into an authentication token.

11. The method of claim 10, further comprising performing steps for providing the authentication token as input to a cryptographic function and comparing a result to a previously stored authentication digest.

12. The method of claim 1, wherein receiving the knowledge factor credential comprises:
retrieving from memory candidate characters based on a user previously designating the candidate characters;
presenting a user interface by which the candidate characters are selectable; and
receiving a user selection of at least one of the candidate characters.

13. A tangible, non-transitory, machine-readable medium storing instructions that when executed by one or more processors effectuate operations comprising:
obtaining, with a computing device, a multi-byte character set specifying a plurality of characters;
receiving, with the computing device, a knowledge factor credential encoded with a plurality of characters of the multi-byte character set, wherein the knowledge factor credential has a longer effective length than an apparent length, wherein receiving the knowledge factor credential comprises:
presenting a user interface by which a single composite character is composed by selecting a plurality of constituent characters;
receiving user selections of the constituent characters, wherein receiving the user selections of constituent characters comprises:
presenting an interface by which the user selects a base character;
receiving a selection of the base character;
in response to receiving the selection of the base character, presenting an interface, or enabling a previously presented interface, by which the user selects a combining mark to be combined with the base character in the single composite character;
receiving a user selection of a combining mark;
determining that the user has not selected more than a threshold amount of combining marks to be combined with the base character; and in response to the determination, accepting an additional combining mark to be combined with the base character in the single composite character; and
combining the constituent characters into a single composite character with a plurality of code points, wherein the single composite character is at least one composite character of the knowledge factor credential; and
providing, with the computing device, the knowledge factor credential to authenticate a user.

14. The medium of claim 13, wherein:
a resulting glyph image of the single composite character is not used in any writing system;
the single composite character comprises a base character and more than two combining marks;
the multi-byte character set specifying a plurality of characters is a Unicode character set specifying more than 256 characters;
the knowledge factor credential has at least one character outside of a block of characters designated for a locale of the computing device;
providing the knowledge factor credential comprises:
encoding a normalized version of the single composite character with Unicode Transformation Format (UTF)-8, UTF-16, or UTF-32;
transforming an encoded version of the knowledge factor credential into an authentication token; and
creating an authentication digest based on the authentication token and at least one other parameter.

15. The medium of claim 13, the operations further comprising: providing an operating system of the computing device to which the user is granted access upon authenticating the user.

16. The medium of claim 13, the operations further comprising: providing an application to which the user is granted access upon authenticating the user.

17. The medium of claim 13, wherein:
a glyph image of the single composite character is not used in any Unicode-recognized writing system.

18. The medium of claim 13, wherein:
providing the knowledge factor credential comprises normalizing the single composite character with Unicode Normalization Form D.

19. The medium of claim 13, wherein providing the knowledge factor credential comprises encoding a normalized version of the single composite character with Uni-24 or Uni-32.

20. The medium of claim 13, wherein presenting the user interface comprises performing steps for displaying a user interface for selecting multi-byte characters.

21. The medium of claim 13, wherein receiving user selection of the constituent characters comprises performing steps for receiving authentication credentials from the user interface.

22. The medium of claim 13, wherein providing the knowledge factor credential comprises performing steps for transforming the authentication credential into an authentication token.

23. The medium of claim 22, the operations further comprising performing steps for providing the authentication token as input to a cryptographic function and comparing a result to a previously stored authentication digest.

24. The medium of claim 13, wherein receiving the knowledge factor credential comprises:
retrieving from memory candidate characters based on a user previously designating the candidate characters;
presenting a user interface by which the candidate characters are selectable; and receiving a user selection of at least one of the candidate characters.

\* \* \* \* \*